United States Patent
Bhardwaj et al.

(10) Patent No.: US 8,032,383 B1
(45) Date of Patent: Oct. 4, 2011

(54) SPEECH CONTROLLED SERVICES AND DEVICES USING INTERNET

(75) Inventors: Vinod K. Bhardwaj, San Jose, CA (US); Scott England, Los Gatos, CA (US); Dean Whitlock, Bristol, TN (US)

(73) Assignee: FoneWeb, Inc., Santa Clara, CA (US)

( * ) Notice: Subject to any disclaimer, the term of this patent is extended or adjusted under 35 U.S.C. 154(b) by 910 days.

(21) Appl. No.: 11/763,870

(22) Filed: Jun. 15, 2007

Related U.S. Application Data

(60) Provisional application No. 60/927,557, filed on May 4, 2007.

(51) Int. Cl.
  *G10L 21/06* (2006.01)
(52) U.S. Cl. .......... 704/275; 704/235; 455/420
(58) Field of Classification Search ........... 704/275, 704/235, 251; 455/419, 414.4, 420
  See application file for complete search history.

(56) References Cited

U.S. PATENT DOCUMENTS

| | | | |
|---|---|---|---|
| 5,715,370 A | 2/1998 | Luther et al. | |
| 6,243,445 B1 * | 6/2001 | Begeja et al. | 379/93.01 |
| 6,513,003 B1 | 1/2003 | Angell et al. | |
| 6,944,593 B2 * | 9/2005 | Kuzunuki et al. | 704/270.1 |
| 6,990,335 B1 * | 1/2006 | Shamoon et al. | 455/419 |
| 6,999,932 B1 * | 2/2006 | Zhou | 704/277 |
| 7,130,401 B2 * | 10/2006 | Rampey et al. | 379/142.14 |
| 7,197,459 B1 | 3/2007 | Harinarayan et al. | |
| 7,792,675 B2 | 9/2010 | Ramaswamy et al. | |
| 2001/0005825 A1 | 6/2001 | Engelke et al. | |
| 2001/0047258 A1 * | 11/2001 | Rodrigo | 704/256 |
| 2001/0047270 A1 | 11/2001 | Gusick et al. | |
| 2002/0055974 A1 | 5/2002 | Hawkes et al. | |
| 2002/0091832 A1 | 7/2002 | Low et al. | |
| 2002/0095290 A1 | 7/2002 | Kahn et al. | |
| 2003/0028448 A1 | 2/2003 | Joseph et al. | |
| 2003/0046350 A1 | 3/2003 | Chintalapati et al. | |

(Continued)

FOREIGN PATENT DOCUMENTS

WO    WO01/93058    12/2001

OTHER PUBLICATIONS

Office Action Jun. 19, 2008; U.S. Appl. No. 11/368,840.

(Continued)

*Primary Examiner* — Abul K Azad
(74) *Attorney, Agent, or Firm* — Beyer Law Group LLP

(57) ABSTRACT

A speech service, including a speech-to-text engine and a text-to-speech engine, creates and maintains user profiles at a central location accessible over the Internet. A user connects to a software application over a mobile telephone and delivers a voice command. The speech service transcribes the voice command into a text command for the software application. The software application performs a service desired by the user and delivers a text result to the speech service that is converted into a speech result that is delivered to the user. A user speaks to a hardware device to perform a function. The hardware device sends the speech to the speech service over the Internet that transcribes the speech into a text command that is sent over the Internet to a device service provider. The device service provider maps the text command into a device command that is then sent back over the Internet to the hardware device to perform the function. A remote hardware device can be controlled using the software application.

20 Claims, 21 Drawing Sheets

U.S. PATENT DOCUMENTS

2003/0125950 A1 7/2003 Avila et al.
2003/0177009 A1 9/2003 Odinak et al.
2003/0187659 A1* 10/2003 Cho et al. .................... 704/275
2004/0019638 A1 1/2004 Makagon et al.
2004/0064317 A1 4/2004 Othmer et al.
2004/0204941 A1 10/2004 Israch et al.
2005/0289130 A1 12/2005 Cohen et al.
2006/0047767 A1* 3/2006 Dodrill et al. ................ 709/206
2006/0149558 A1 7/2006 Kahn et al.

OTHER PUBLICATIONS

Office Action dated Apr. 7, 2009 in U.S. Appl. No. 11/368,840.
PCT/US/07/05568; Mar. 5, 2007; International Search Report.
PCT/US/07/05568; Mar. 5, 2007;Written Opinion of the International Searching Authority.

* cited by examiner

FIG. 3
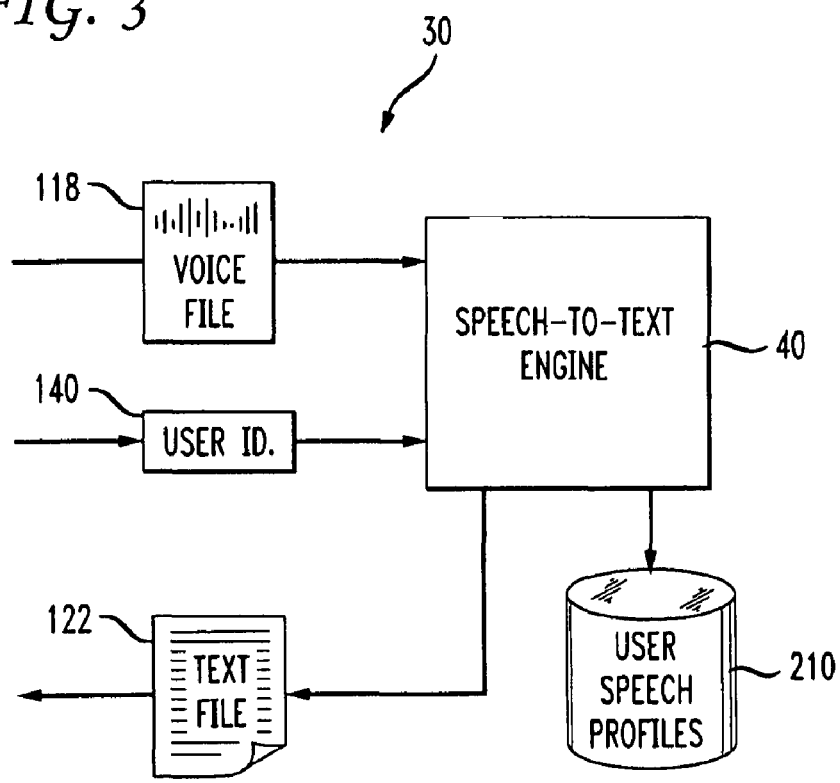
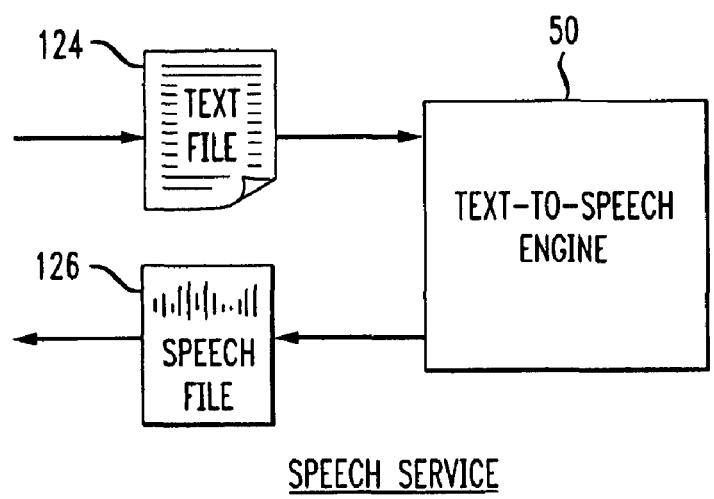
SPEECH SERVICE

FIG. 6
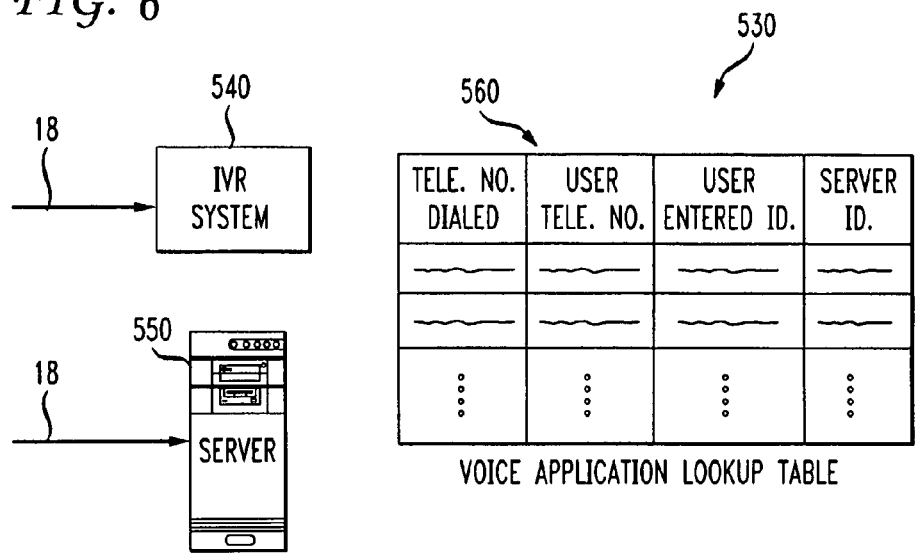
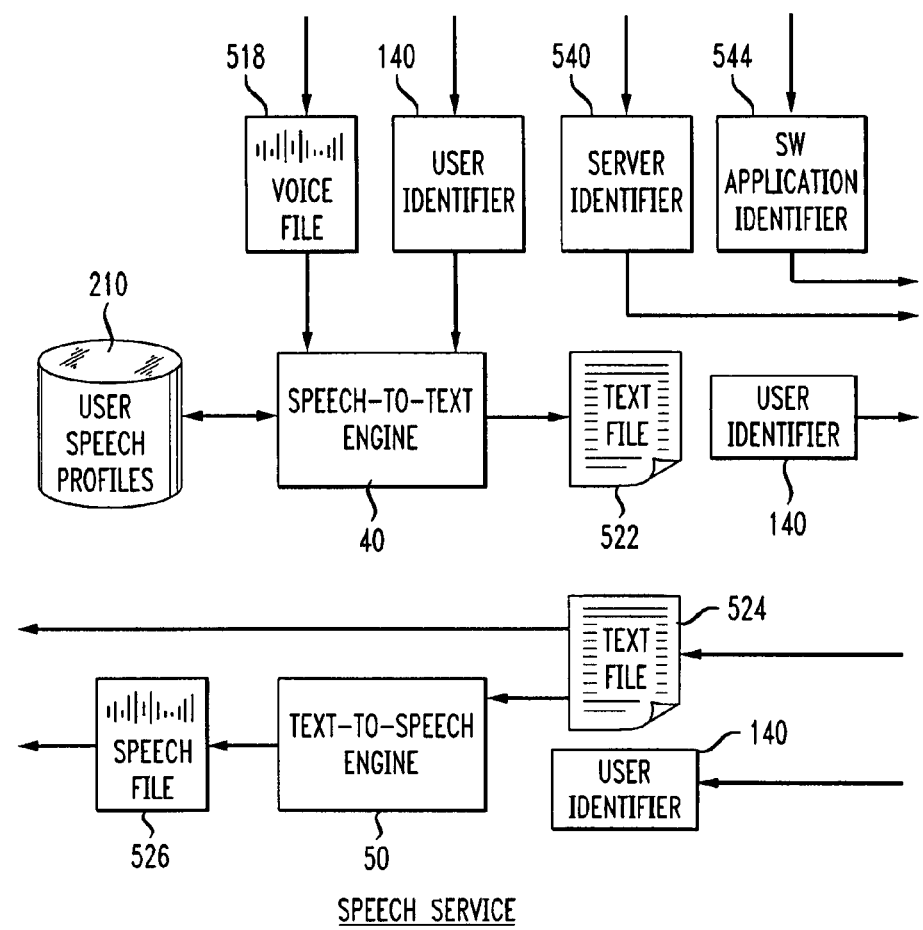

VOICE APPLICATION INFRASTRUCTURE

DEVICE MAPPING TABLE

COMMAND MAPPING TABLE

SPEECH CONTROLLED SERVICES AND DEVICES USING INTERNET

CROSS-REFERENCE TO RELATED APPLICATIONS

This application claims priority of U.S. provisional patent application No. 60/927,557 filed May 4, 2007 which is hereby incorporated by reference.

This application is related to U.S. patent application Ser. No. 11/763,943 filed on the same date herewith, entitled "Precision Speech-to-Text Engine," which is hereby incorporated by reference.

FIELD OF THE INVENTION

The present invention relates generally to performing services and controlling devices using speech. More specifically, the present invention relates to using speech over the Internet to request a service or to control a device.

BACKGROUND OF THE INVENTION

The use of mobile telephones is becoming more prevalent. More people now carry mobile telephones wherever they go; they expect a signal in most locations and expect to be able to communicate with others and to receive information virtually anytime and anywhere. But, the current technological climate hampers the ability of a person to send and receive information.

U.S. patent application Ser. No. 11/368,840 filed Mar. 6, 2006 entitled "Message Transcription, Voice Query and Query Delivery System" presents techniques for converting speech to text and is hereby incorporated by reference. Nevertheless, there is room for improvement.

Currently, speech recognition software requires that each user have a custom user profile. These user profiles are distributed in the sense that a user must have numerous user profiles if he or she uses different speech recognition software. (For example, while the DRAGON brand software from Nuance Corporation might be used on an IBM-compatible computer, it cannot be used on a computer from Apple Inc., so the user may choose the ILISTEN brand software available from MacSpeech, Inc. for use on an Apple computer.) Further, even if the user always uses a single brand of computer, his or her speech profile must be physically transported and installed on each computer (home, office, travel computer) that the user might be using.

The huge vocabulary of potential words that a user might speak also presents a problem. Speech recognition companies attempt to ameliorate this problem by providing language-specific versions of their software tailored to specific categories of users. For example, a speech recognition engine may provide versions based upon "English," "American English," "Indian English," etc., in an attempt to reduce the vocabulary required and to increase accuracy of the engine. Nevertheless, each engine may still require a vocabulary of 50,000 to 100,000 words in order to accurately convert speech to text for any potential user in a given category (in order to match any potential spoken word with a known word in the vocabulary).

Further compounding the problem is that each user of a particular brand of speech recognition software must perform training of that software for it to be accurate. At least two to three hours of training are typically required. Although certain speech engines advertise that no training is required, realistically, at least a minimal amount of training is needed otherwise accuracy suffers. It is not uncommon for a professional user of speech recognition software to spend many hours training that software in order to achieve the highest accuracy. And finally, a user or enterprise must deal with the mechanics of installing and maintaining speech recognition software that can be a great burden. The software must be selected based upon available computers, purchased, installed and maintained. Problems with computer compatibility, lack of memory, etc., are not uncommon. Many versions of installed speech recognition software are out of date (and hence less accurate) because the user or enterprise has not bothered to update the software.

In addition, a user may wish to perform an action, request a service, or retrieve information from a company, web site or other location when all the user has at their disposal is a mobile telephone, voice-enabled computer or other similar voice input device. It can prove difficult for a user to find a person to speak with, or, even if a company has a software application or web site that has the information the user desires or that has the capability to perform a particular service, such software application or web site may be unable to handle the user's request by voice.

Further, various hardware devices such as telephones, cameras, television remote controls, navigation devices, etc. are becoming increasingly more complex to use. A user may know the exact result they wish to achieve with the device but may not know the required instructions, sequence of buttons, controls, etc., to make the device perform the desired function. Currently, it is not feasible for each and every hardware device to incorporate artificial intelligence such that the device can understand a user's speech command and perform the desired function. Yet, a user would like to be able to give a voice command to a device in order to control it.

Another challenge facing any system that handles user speech is the quality of the user speech and dropped connections. Generally, the quality of a live telephone connection (especially with mobile telephones, cordless home telephones, "smart" telephones, a VoIP connection, a SKYPE-type telephone service, etc.) can be poor, compared with traditional, wired analog telephones. Any service that handles user speech arriving over a live telephone connection must deal with lower quality voice data. Also, any time user speech is being recorded over a live telephone connection there is always the possibility of dropouts, static, dead zones, and a dropped connection.

Based upon the above state of technology and the needs of individuals, various systems, services and methods are desired that would address the above needs.

SUMMARY OF THE INVENTION

To achieve the foregoing, and in accordance with the purpose of the present invention, a central speech-to-text and text-to-speech service is disclosed.

This centralized speech service creates and maintains a user profile for each user at a central location. The speech service also uses and maintains any number of the latest speech engines to provide speech-to-text conversion, may use a combination of such engines, and may also implement custom versions of such speech engines. Because the particular speech engine used is maintained at a central location, the speech service can always make sure it is using the latest versions of the available speech engines. There is no need for a user to purchase, install or maintain a speech engine on each computer or device that the user might use.

Because the speech service creates and maintains the user profile at a central location, there is no need for the user to create a profile or to spend time training that profile. Further, any hardware or software application that desires to use the speech service is provided with the assurance that the user's profile is up-to-date, accurate and is continually being improved. In this way, software developers, service providers, web sites and device manufacturers can all rely upon the speech service as providing a quality user profile. The user profile that is used to control a television remote is the same profile used to control a GPS (for example). Each user profile may be shared with any hardware or software developer that desires to incorporate speech recognition to technology into their service or device. The profile is shared in the sense that the hardware or software developer uses the speech service to perform speech-to-text conversion using the user's profile.

Further, using techniques from application Ser. No. 11/368,840, human agents can continually improve the user's profile as a user uses the speech service to convert speech to text. Having human agents in the loop of speech conversion (at least initially) improves speech conversion because the agents can add words, correct words, create dedicated text for particular verbal expressions, and generally improve the user's profile. Speech-to-text conversion improves as a user uses the speech service. It is contemplated that an initial conversion of user speech might require substantial input from a human agent. But, as the user continues to use the speech service, and as the user's profile grows and becomes more accurate, reliance upon the human agent becomes less and less necessary until eventually all speech-to-text conversion is occurring automatically by computer without human intervention. Because a particular user's speech is only compared to his particular profile (instead of to a general vocabulary of tens of thousands of words), accuracy is approved.

The result of such a centralized speech service with centrally located user profiles is an extremely accurate speech to text conversion service. Of course, the speech service itself may be distributed over different servers or geographic locations, yet still be viewed as a central service from the point of view of users and hardware and software developers. The present invention is thus an enabling technology for any type of hardware or software developer that desires to use speech recognition.

A first embodiment of the present invention relates to an Internet-based speech service that allows a user to connect to a web site by mobile telephone and to request a service of that web site simply by using his or her voice. Such an Internet-based speech service facilitates the development of speech-controlled software applications on any web site.

In a basic implementation the speech service receives the user's voice command (via the web site owner) and converts that speech into a text command that is sent back to the web site owner. The web site owner (or a software application) uses that text command to initiate a service and produce a text result that is returned to the speech service. The speech service converts the text result into a speech result and provides the speech result to the web site owner that may then play that speech result back to the user over his or her mobile telephone. The speech service thus provides two-way voice communication between a user holding a mobile telephone and a software application running on a web site owner's computer, thus enabling developers to create software applications that one may talk to to get things done.

Thus, a mobile telephone is transformed into a universal input/output device like a mouse or computer keyboard. A software developer may thus develop software applications based upon textual input and output without worrying about the nuances of understanding speech or speech-to-text conversion.

A second embodiment of the present invention relates to an Internet-based speech service that allows a user to control a device simply by using his or her voice. Any appropriately enabled device may then be controlled by voice command. For example, a user speaks directly to a television remote control using commands such as "close captioning," "change channel," "volume up," etc. The speech service receives the user's voice command (via an Internet connection implemented in the remote control) and converts that speech into a text command that is sent back to the remote control. The remote control then takes appropriate action based upon that text command. This embodiment is also useful for setting up a GPS, a VCR, a camera, or other similar equipment.

In a variation on this embodiment the text command is first sent from the speech service to a device service provider web site that translates the text command into a device specific command. This device specific command is then sent back to the remote control over the Internet and the remote control implements the command. In this fashion the service provider translates a text command from the user into any suitable machine-readable command that the device will understand.

One advantage of this second embodiment is that the manufacturer of a device (such as a television remote control), need not be concerned with speech recognition and the control of the device based on speech. The manufacturer simply built a device that operates using traditional inputs or machine commands. Likewise, depending upon the complexity of the device, an application developer for the device may develop control hardware and software for that device based upon these traditional inputs and machine commands. The application developer need not be concerned with speech recognition. The conversion of the speech into a text command (and optionally translation of the text command into a machine-readable command) is performed by the speech service (and optionally by the device service provider). If necessary, text-to-speech conversion is also performed by the speech service. The device manufacturer and device application developer can focus on improving the device without worrying about understanding human speech.

A third embodiment of the invention allows a user to control a remote device by using a mobile telephone or other input device. Similar to the first embodiment, a user telephones a voice application infrastructure or a speech service and delivers a voice command (along with other identifiers if necessary). This voice command is converted to text and delivered verbatim to the remote hardware device, or is mapped into a device command by a device service provider and the command is then delivered to the remote hardware device. The advantage is that a user may control a remote hardware device simply by having access to a mobile telephone or other similar voice input device.

A fourth embodiment addresses the problems with low-quality telephone calls and dropped connections by having a user first record a digital audio file on his or her mobile telephone and then upload the entire audio file to a speech delivery system when appropriate. In addition, a novel addressing scheme allows the user to easily send a transcribed audio file to a recipient with no prior registration or with minimal user registration.

BRIEF DESCRIPTION OF THE DRAWINGS

The invention, together with further advantages thereof, may best be understood by reference to the following description taken in conjunction with the accompanying drawings in which:

FIG. 3 is a block diagram of speech service.

FIG. 6 is a block diagram illustrating speech service.

DETAILED DESCRIPTION OF THE INVENTION

Embodiments of the present invention facilitate the development of speech-controlled applications without the need for speech recognition software to be included in a particular application. Speech recognition is a continuously developing field and by outsourcing this task to a central service an application developer can concentrate on their core competence—developing the application. Any suitable software application can be developed quickly where the speech-to-text conversion is handled entirely by embodiments of the present invention.

The first embodiment of the present invention provides two ways in which a voice application developer can develop speech-based applications so that a user may request a service using speech. In the first variation, the voice application receives a voice command from the user and the application sends a voice file to the speech service at a specified URL; the transcribed text file is returned to the voice application for processing. In this variation the application provides for recording of a user's voice.

In the second variation, the user telephones the speech service directly and gives a voice command. This command is transcribed into a text file and sent over the Internet to an application-specified URL; the application processes the user's text command and returns a text result for each request (or performs the requested service). The returned text may be spoken to the user or delivered as text. The speech service may be accessed using a single telephone number or each specific application is allocated a different telephone number that is handled by the speech service.

This first embodiment thus facilitates and enables voice applications that can use the present invention to handle the speech-to-text conversion (and the text-to-speech conversion if desired). The second embodiment of the invention described below imparts speech communication capability to any hardware device connected to the Internet. A user may simply speak a voice command to a hardware device in order to control it. The third embodiment of the invention described below allows a user with a mobile telephone to remotely control any hardware device having Internet access.

Speech Controlled Services

Figure 1:
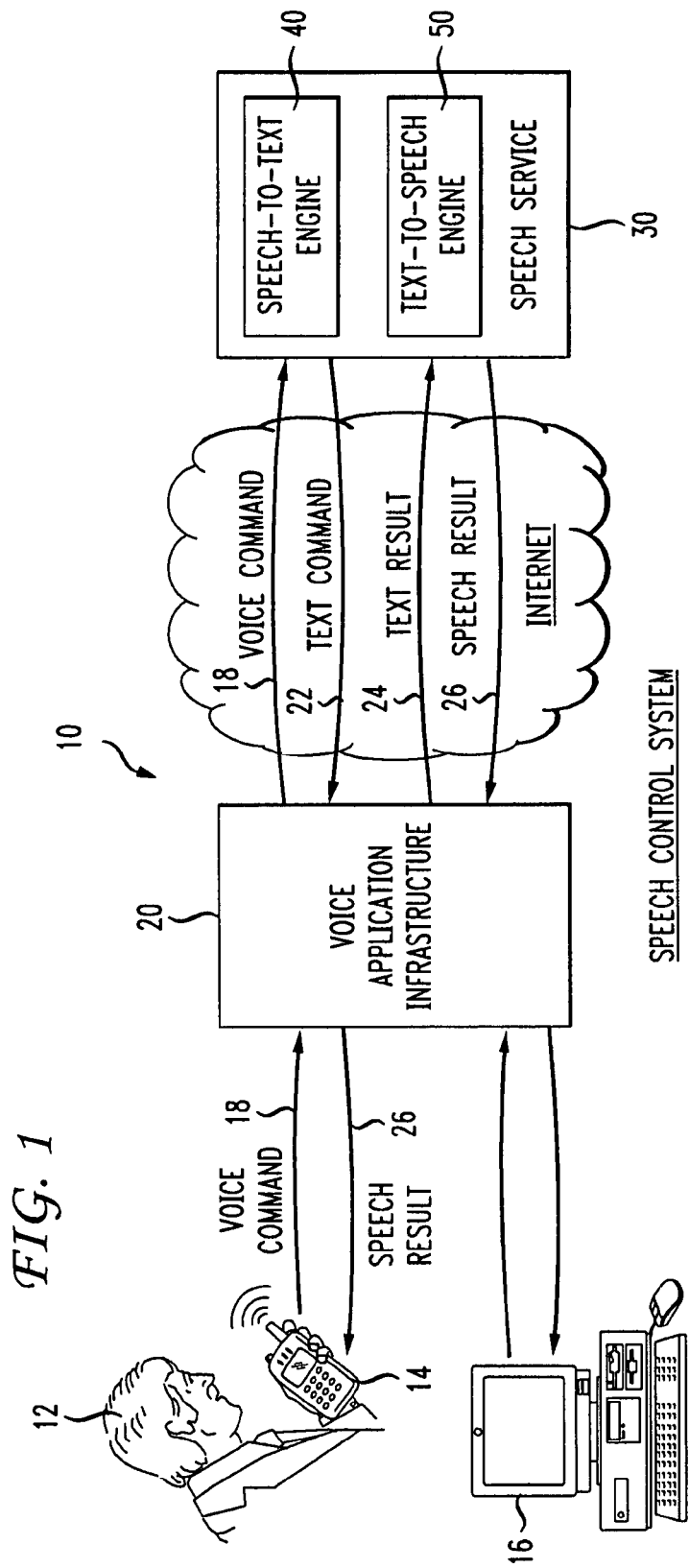
FIG. 1 is a block diagram of a speech control system according to one embodiment of the invention.

FIG. 1 is a block diagram of a speech control system 10 according to one embodiment of the invention. Included are an individual 12 and input devices such as a telephone 14 and a computer 16. Telephone 22 is any suitable telephone such as a traditional rotary dial or touch-tone telephone, cordless telephone, cellular telephone, mobile telephone, smart telephone or any similar device arranged to transmit voice over a PSTN line. Further, PDAs or similar handheld electronic communication devices (such as a BLACKBERRY device) may also be arranged to function as telephones and to transmit voice information.

Telephone 14 may also communicate with a VoIP (voice over IP) provider over a PSTN line or over any other suitable telecommunications line for connecting a telephone with a VoIP provider. Any suitable VoIP provider may be used that is arranged to accept a local telephone call, convert it into VoIP format and transmit it over the Internet as a VoIP call to a destination.

In an alternative embodiment, user 12 places a VoIP call directly using a computer 16 (or an IP telephone). For example, user 12 may use an analog telephone adapter to connect a standard telephone to his computer or Internet connection in order to place a VoIP call using a VoIP provider. Computer 16 may also be used with appropriate software and an Internet connection to directly place a VoIP call. Or, user 12 may use an IP telephone that has an Ethernet connector that connects directly to a router to place a VoIP call, or may use a WiFi IP telephone to place a VoIP call from any WiFi hot spot. For example, by using an IP telephone a user can make a direct VoIP call; the user enters an IP telephony address, a direct IP address or uses the ENUM system.

The input device, such as telephone 14, is used by the user to transmit his or her voice command 18 to voice application infrastructure 20 to perform a task, achieve a result, request a service, receive feedback, control a device, or otherwise execute the desire of the user by using his or her speech input. Voice application 20 interacts with speech service 30 to achieve the result. Voice application 20 is any suitable application that uses a voice command to perform the desire of the user. For example, voice application 20 is located on a server of a company along with an interface to the company telephone system.

Voice command 18 is received by the voice application and transmitted to speech service 30 to be converted into a text command 22. The text command is then used by the voice application to perform the function desired by the user. If the application produces a text result that the user wishes to hear, text result 24 is converted into a speech result 26 by speech service 30 and the speech result is then played back to the user over his or her telephone 14.

Speech service 30 is a suite of application software housed on a server or servers accessible via the Internet. In one embodiment, the techniques of application Ser. No. 11/368,840 may be used to implement the server or servers. Speech-to-text engine 40 is any suitable speech-to-text engine capable of translating voice or audio data spoken by an individual into accurate text. Any suitable speech recognition software may be used such as Dragon NaturallySpeaking (version 8) or Nuance software available from Nuance Communications Inc., ViaVoice (version 10) available from IBM, Sphinx open source speech recognition (version 4) available from CMU. When a single speech engine is used, the Sphinx speech engine has been shown to work particularly well. In one embodiment, the techniques of application Ser. No. 11/368,840 may be used to perform speech translation. In one very specific embodiment, speech translation is performed as described in the application referenced above entitled "Precision Speech-to-Text Engine." Text-to-speech engine 50 is arranged to perform text-to-speech conversion using any suitable voice synthesis software such as that available from AT&T, IBM, or Cepstral.

In an alternative embodiment, audio and text files and other information are transmitted between application infrastructure 20 and speech service 30 by any suitable telecommunications network.

Figure 2:
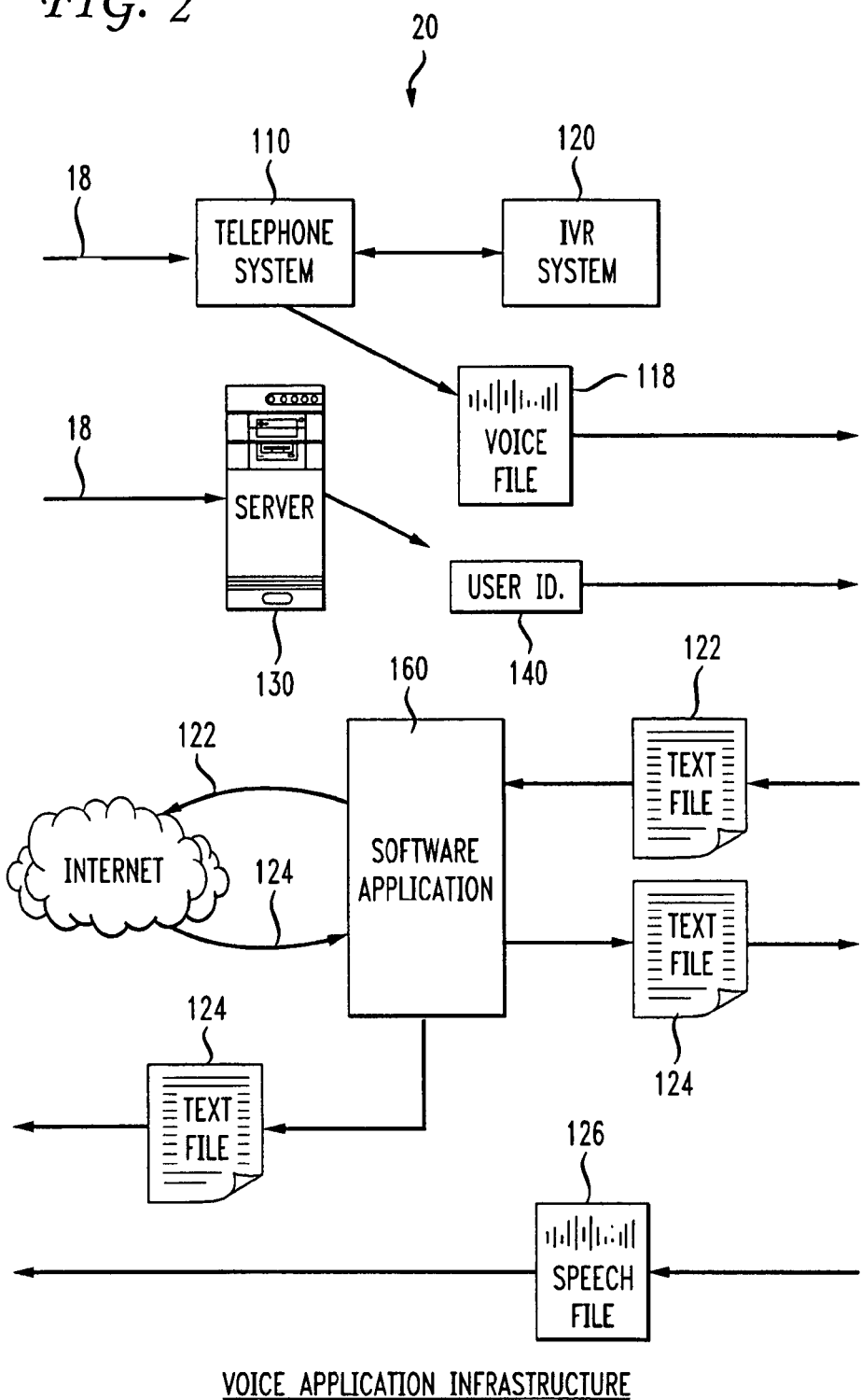
FIG. 2 illustrates one possible embodiment of voice application infrastructure.

FIG. 2 illustrates one possible embodiment of voice application infrastructure 20. Of course, an entity implementing infrastructure 20 may choose to handle the incoming and outgoing voice and text information in any suitable manner. Voice command 18 is received at a telephone system 110 or at a computer 130 depending upon the input device used by the user 12. Telephone system 110 may interact with an IVR (interactive voice response) system 120 as is known by those of skill in the art to process any incoming call. Those of skill in the art will appreciate that a user may be instructed to provide a particular user identifier in any suitable form and be instructed to dictate a particular voice command that is saved into a voice file 118.

A user may provide a user identifier by speaking his or her name or unique word or phrase, by identifying the user by a voice print, by pressing any of the keys on the telephone keypad, by keying an SMS message, etc. Alternatively, the user identifier is taken to be the telephone number from which the user is calling (using a caller identification service) or any unique identifier derived from that telephone number. The user identifier 140 is recorded by the voice application and associated with the voice file 118.

If the voice command 18 arrives at server computer 130 then computer 130 produces voice file 118 and user identifier 140. As is known to those of skill in the art, voice command 18 may arrive at the server computer already in the form of a digital voice file. In this case, the user provides any suitable user identifier by making an entry at computer 16, speaking a word or phrase, etc. Alternatively, the user identifier is taken to be the unique IP address of user computer 16 or any unique identifier derived from that address.

Once speech service 30 has produced the text command corresponding to the voice command, command text file 122 is received by software application 160. This software application is any suitable program for performing a service, achieving a result, or taking an action directed by the user and may be implemented in any fashion at the discretion of the owner of the voice application infrastructure. Application 160 made an perform its desired action within the context of the entity controlling the voice application infrastructure, or may send text file 122 over the Internet (or over another suitable communication medium) in order to perform the desired service at a different location. Any result is returned as a text file 124, that is then returned to speech service 30. If desired, result text file 124 is converted into a result speech file 126 and returned to voice application infrastructure 20. The infrastructure then uses either telephone system 110 or computer 130 to play back or otherwise deliver speech file 126 to the user so that the user may hear the result. The user listens to the speech result on his or her telephone 14 or hears the speech file played back on his or her computer 16.

Any suitable format for the text files, voice and speech files may be used. By way of example, the message is first recorded as a WAV file and then converted into MP3 format. Other formats for the voice and speech files are WMA, GSM or other.

FIG. 3 is a block diagram of speech service 30. The speech service may be implemented on any suitable computer server or servers, and may be located in any suitable location having a high-speed Internet connection. Other methods for connecting speech service 30 with voice application infrastructure 20 may also be used.

As shown, voice file 118 and user identifier 140 are input by engine 40 and converted into a text file 122 using database 210 of user speech profiles. If necessary, text file 124 is input into engine 50 and converted into a speech file 126. Database 210 of speech profiles may be obtained and stored in any suitable manner. In one embodiment, a speech profile for a given user is created and updated when the user makes use of the systems disclosed in application Ser. No. 11/368,840. The more the user interacts with these systems and provides examples of his or her speech, the more that his or her speech profile may be corrected and refined. The user's profile is then stored in database 210. In another embodiment, a user makes use of any transcription service related to the systems disclosed in application Ser. No. 11/368,840 that is controlled by a party having a relationship with the owner of speech service 30. The user's speech profile developed may then be transferred to database 210.

Any suitable speech profile may be used with the present invention. As is known in the art, each particular speech engine will create a custom, most likely proprietary user speech profile to use in converting the user's speech to text. It is known that human speech is comprised of approximately 50-60 phonemes, i.e., the basic sounds that make up human language. Each person will pronounce a phoneme or word differently, thus, an individual user speech profile is used to help the speech engine convert speech to text. Typically, a baseline numerical representation of a phoneme sound is known to the speech engine. The user profile then, records the variation from this baseline for each phoneme that the speech engine keeps track of for that user. A user profile may be thought of as a sequence of phonemes and their variations. In addition, a user profile may also contain concatenation of phonemes, including length data, stressed data, etc., all describing how an individual person pronounces sounds and words. Of course, a particular speech engines may implement a user profile in different manners and the present disclosure is not intended to limit the present invention to any particular type of speech profile. The present invention works well with any type of user speech profile in a particular speech engine chooses to use. Accordingly, where a speech profile database is shown or discussed, it will be understood that such a database stores a different user speech profile for each speech engine that is being used. For example, some speech engines make use of a greater number of phonemes to improve accuracy, but at the expense of longer processing times.

In an alternative embodiment of the invention, the speech service stores all input user voice files and their corresponding text files. For example, techniques described in the application mentioned above entitled "Message Transcription, Voice Query and Query Delivery System" may be used to create a nearly perfect text file corresponding to the voice file input. Thus, while the initial text file output by speech engine may not be entirely accurate, the text file corrected by human agents may be nearly perfect. Therefore, these pairs of voice files and nearly perfect text files may be stored and later used to train any particular speech engine without the need for any user effort. For example, these pairs of files may be fed into a speech engine in order to train that engine for the user's voice and to develop a custom user speech profile for that engine. In much the same way that a user might have to spend many hours training a speech engine by reading text out loud into a microphone, this embodiment trains any speech engine rapidly without the need for a user to spend any time doing the training. The existing voice and text files are fed into any speech engine and the user profile is developed automatically. In this sense, the set of pairs of voice and text files may be thought of as a form of user profile themselves. One of skill in the art will understand and be able to input a voice file and a corresponding text file into a speech engine in order to develop a user profile. The present invention improves upon this technique by providing a central repository for speech engines and user profiles i.e., a central speech service accessible easily over the Internet.

Figure 4:
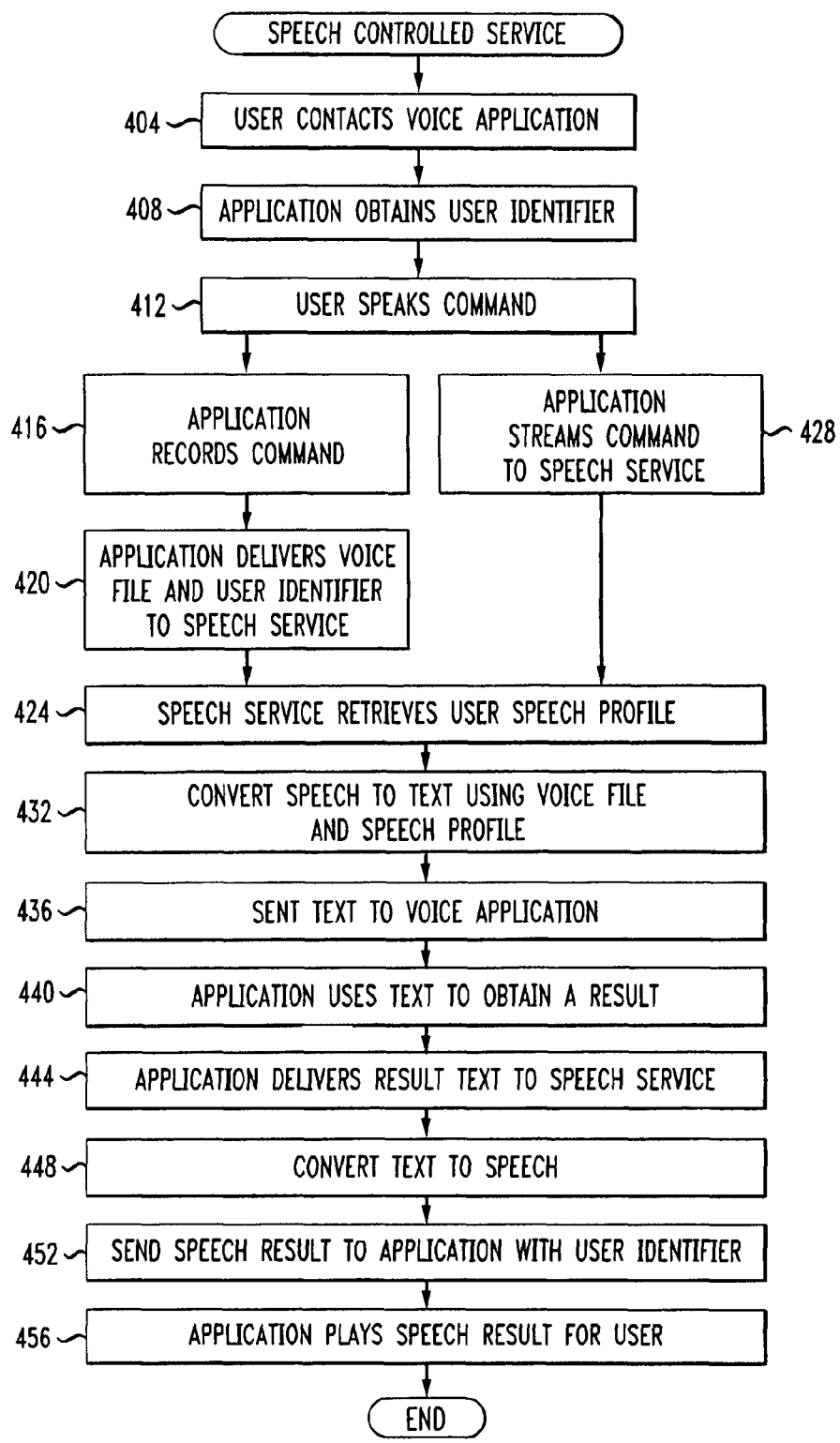
FIG. 4 is a flow diagram describing one embodiment for the implementation of speech control system.

FIG. 4 is a flow diagram describing one embodiment for the implementation of speech control system 10. In step 404 the user contacts voice application infrastructure 20 using a telephone, computer or other device by which the user may speak to the voice application.

The user accesses a general service access number, dials into a telephone system, or dials an application-specific telephone number. The user may also record a voice file ahead of time and deliver this voice file via computer or telephone to the infrastructure 20.

According to the actual implementation of the voice application, the user is presented with a welcome message, instructions, a prompt, or other directions on how to proceed. In one embodiment, only minimal or no instructions are needed as the user knows what to do and can immediately begin speaking the voice command.

Once a connection is made by the user to voice application 20, the connection is maintained while processing occurs and a speech result 26 is readied for the user. In other words, this is a real-time service that processes a user's request and prepares a result while he or she waits on the telephone or at the computer. For those specific applications where the user does not expect a speech or text result he or she may hang up the telephone once the voice command is delivered.

In step 408 the application obtains the user identifier from the user or his or her telephone or other device. For example, a caller identification service is used to obtain the user's telephone number, the user enters a number or PIN, or the user speaks a word or phrase. The user identifier is stored by the voice application and may be transmitted each time voice file 118 or text file 124 is transmitted, or the application initiates a session or other means of keeping track of which user is identified with the voice and text files that are currently being processed.

In step 412 the user speaks a command, phrase or longer speech that is intended to be an instruction, information, request or other desire of the user to be performed by the voice application. For example, if the user wishes to know his or her checking account balance he speaks the voice command "account balance."

In step 416 the application records this voice command as voice file 118 and associates this voice file with user identifier 140. In step 420 the application delivers the voice file and user identifier to speech service 130 over the Internet, by placing a telephone call, using wireless transmission or using any other suitable telecommunications network. Alternatively, in step 428 the application streams the voice command to the speech service (along with the user identifier) instead of having to record the voice command as a voice file. This technique saves the owner of the voice application from having to deal with recording, storage and transmission of voice files, although the voice command may be concurrently saved into a voice file as well. Streaming also allows the voice command to be fragmented in real time by the speech service and sent to different transcription agents in order to speed up the transcription and reply process as described in the application "Precision Speech-to-Text Engine" mentioned above. Streaming may occur as known in the art; the user voice is sent in real-time over the network as the voice data is received at the application.

In step 424 the speech service retrieves the user's speech profile from database 210 using user identifier 140. Advantageously, neither the user nor the voice application need be concerned with speech recognition or training of a speech recognition engine. By storing user speech profiles in a central location the speech service can process voice commands for a particular user who might be using voice applications from any number of vendors. In step 432 engine 40 converts the voice file into a text file 122 using any of the speech-to-text techniques mentioned above. In step 436 the speech service sends text file 122 to voice application 20 where it is handled by software application 160. In step 440 application 160 uses text file 122 (representing the user's original voice command) to perform the function desired by the user to achieve a result. The resulting text is stored as text file 124. If desired, application 160 may immediately deliver text file 124 back to the user via any suitable technique such as by e-mail, by an SMS message, by sending to a particular URL, etc., whichever preference the user has set up previously or is the default.

In step 444 the application delivers text file 124 back to the text-to-speech engine 50 along with user identifier 140 if necessary. In step 448 engine 50 converts text file 124 into speech file 126 using any of the techniques mentioned above. In step 452 the result speech file 126 and the user identifier are returned to the voice application. In step 456 the voice application delivers speech file 126 to the user either by playing the speech file over the user's telephone, by delivering this speech file to the user's computer or by streaming the speech file to the user's computer. In an alternative embodiment, text-to-speech engine 50 may be present within voice application infrastructure 20 and the conversion of text file 124 into speech file 126 can occur within the infrastructure, thus saving time and effort.

Alternatively, there is no requirement that the resulting text file 124 be converted into an audio file. Text file 124 may be delivered as is, or, if the result desired by the user does not necessarily result in a textual output, there is no need for text file 124 to be produced. For example, the voice application performs a service for the user based upon the user's voice command that does not necessarily result in text or speech being returned to the user.

Figure 5:
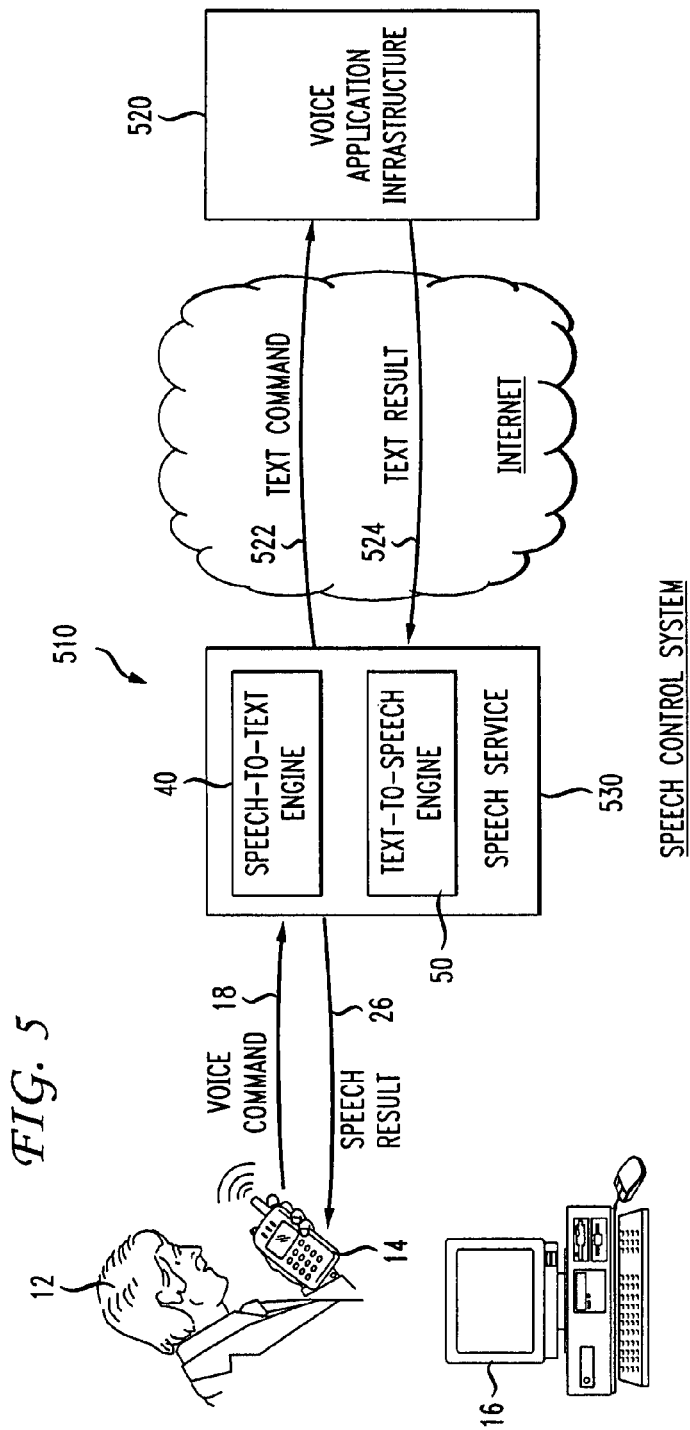
FIG. 5 is a block diagram of a speech control system according to a variation of the first embodiment of the invention.

FIG. 5 is a block diagram of a speech control system 510 according to a variation of the first embodiment of the invention. As with speech control system 10 of FIG. 1, speech control system 510 includes a user 12 issuing a voice command 18 via a telephone, computer or other input device. The user intends that the voice command will eventually be processed by a voice application infrastructure 520 in order to produce a result desired by the user. If desired by the user, and if appropriate to the type of application, a speech result 26 is returned to the user. System 510 differs from system 10 in that speech service 530 is positioned between the user and the voice application, rather than the other way around. In this manner the speech service in a sense replaces the keyboard and monitor where the speech-to-text engine replaces the keyboard and the text-to-speech engine replaces the monitor.

FIG. 6 is a block diagram illustrating speech service 530. In this variation, the speech service includes more functionality as it is positioned between the user and the voice application. Included is an IVR (interactive voice response) system 540 and a computer 550 for handling the incoming call from the user. A voice application lookup table 560 allows a server identifier identifying the location of voice application infrastructure 520 to be identified from any number of input fields. Further, a specific software application identifier 544 may also be derived from various input fields. A voice file 518 is produced representing voice command 18 from the user and a user identifier 140 is produced in any of the manners discussed above. A speech to text engine 40 produces a text file 522 which is sent to the voice application along with the user identifier. A text-to-speech engine 50 produces a speech file 526 using text file 524.

Figure 7:
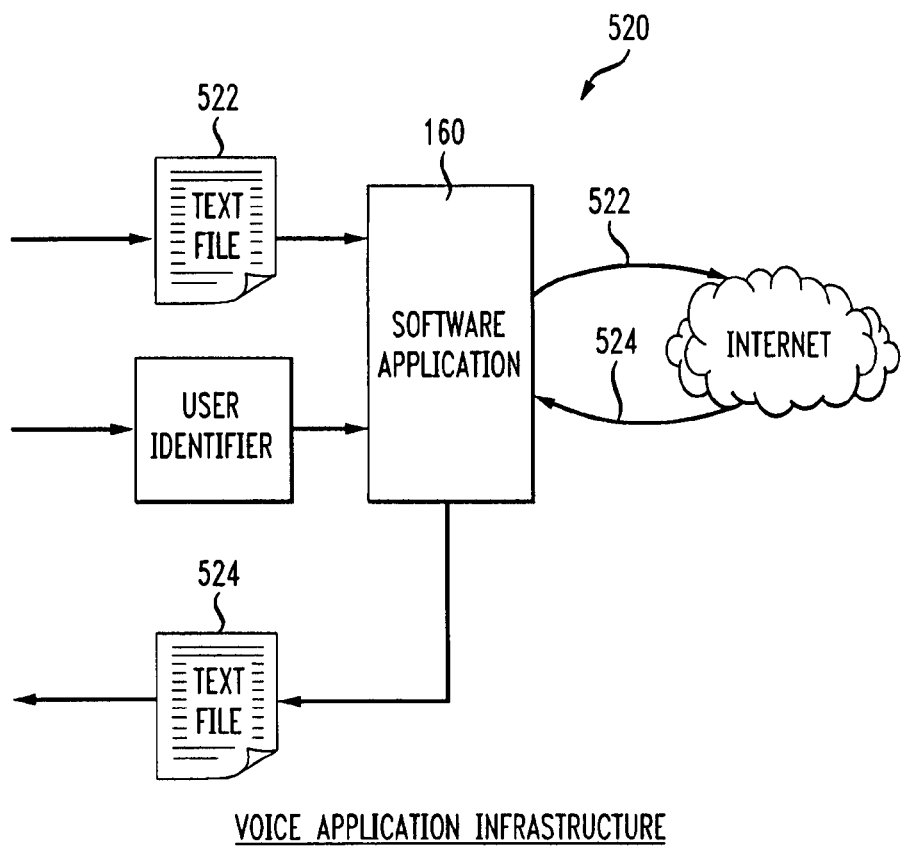
FIG. 7 is a block diagram of voice application infrastructure.

FIG. 7 is a block diagram of voice application infrastructure 520. This infrastructure includes less functionality than infrastructure 20 as it only needs to handle an incoming text file and to output an outgoing text file.

Figure 8:
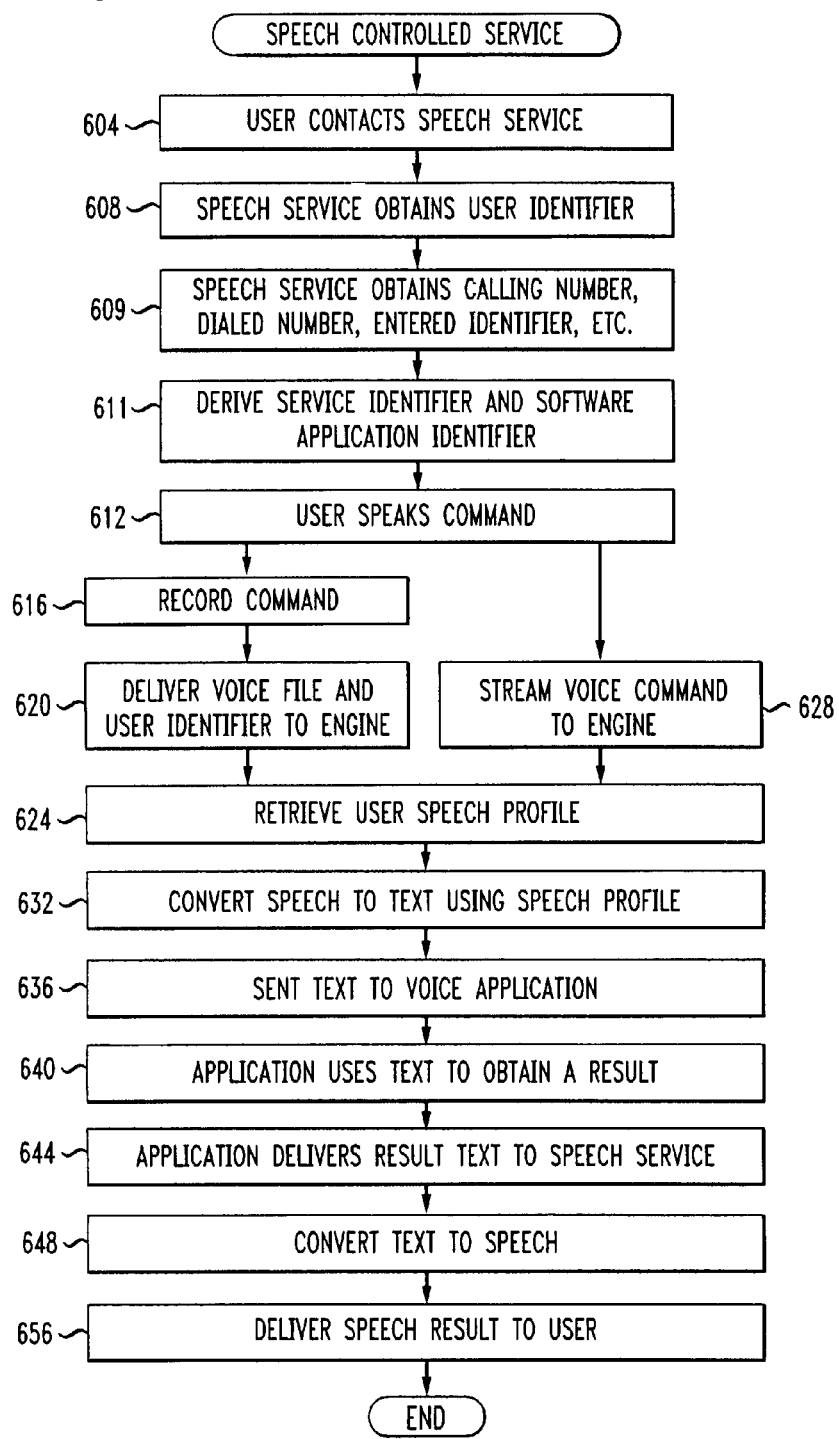
FIG. 8 is a flow diagram describing one embodiment for the implementation of speech control system.

FIG. 8 is a flow diagram describing one embodiment for the implementation of speech control system 510. In step 604 the user contacts speech service 530 using a telephone, computer or other device by which the user may speak to the speech service. The user dials a general telephone number, an application-specific telephone number or other. The user is presented with a welcome message, instructions, a prompt, or other directions on how to proceed via IVR system 540. In one embodiment, only minimal or no instructions are needed as the user knows what to do and can immediately begin speaking the voice command.

Once a connection is made by the user to speech service 530, the connection is maintained while processing occurs and a speech result 26 is readied for the user. In other words, this is a real-time service that processes a user's request and prepares a result while he or she waits on the telephone or at the computer. For those specific applications where the user does not expect a speech or text result he or she may hang up the telephone once the voice command is delivered. In one embodiment, the user chooses an option when first dialing in to the voice application that allows the user to hang up and be called back. When the result is ready, the service dials the user telephone (or computer) number and reads or plays back the result to the user.

If the user is accessing the speech service via computer 16 or a similar computing device, a voice file 518 may be recorded at the computer and delivered directly to the speech service at computer 550. If IP telephony is used, then the voice call is processed using IVR system 540. In either case, in step 608 the speech service obtains the user identifier from the user or his or her telephone or other device as described above in step 408. The user identifier is stored by the speech service and may be transmitted each time voice file 518 or text file 524 is transmitted, or the speech service initiates a session or other means of keeping track of which user is identified with the voice and text files that are currently being processed.

In step 609 the speech service obtains other information from the nature of the call or from the user in order to identify specifically which server or software application the user wishes to access. For example, the service obtains the actual telephone number dialed by the user that may be an application-specific telephone number that identifies the specific voice application infrastructure that the user wishes to access. Or, the service obtains the user's telephone number or any user-entered identifier from the telephone or computer keypad. This information is stored in a look-up table 560 as appropriate.

In step 611 a server identifier 540 is derived using any of the fields in table 560. For example, a dialed application-specific telephone number may uniquely identify a particular voice application 520 that the user wishes to access. Or, if the user only accesses a single application, identification of the user via his or her telephone number, or any entered identifier may be enough to identify voice application 520. In one embodiment, server identifier is a particular URL that identifies a unique location for voice application infrastructure 520. In the simple case, a single software application 160 is present at this URL and this is the software application that the user wishes to access. In more complex embodiments, there may be many software applications residing within a particular voice application infrastructure that is implemented on a particular server at a particular URL. In these situations a look-up table similar to table 560 may be used to also derive a specific software application identifier 544 to identify the specific software application desired. For example, the dialed telephone number may indicate a particular server identifier, while the user may enter a particular identifier to identify the specific software application. Or, the vendor of the software application may provide a unique telephone number for the user to dial for each software application, even though all software applications reside on the same server. In that case, the unique telephone number maps to a common URL and a unique software application. Alternatively, IVR system 540 prompts the user to enter a specific software application identifier when it is determined that the telephone number they have dialed is associated with more than one software application. Or, a telephone menu tree with options may be used to allow the user to select a software application.

In step 612 the user speaks a command, phrase or longer speech that is intended to be an instruction, information, request or other desire of the user to be performed by the voice application. In step 616 the speech service records this voice command as voice file 518 and associates this voice file with user identifier 140. In step 620 the application delivers the voice file and user identifier to speech-to-text engine 40.

Alternatively, in step 628 the speech service streams the user's voice command to the engine 40 (along with the user identifier) instead of having to record the voice command as a voice file. Streaming may occur as is know in the art. In step 624 the speech service retrieves the user's speech profile from database 210 using user identifier 140 and feeds it into engine 40. Alternatively, the engine retrieves the profile when it needs it.

In step 632 engine 40 converts the voice file into a text file 522 using any of the speech-to-text techniques mentioned above. In step 636 the speech service sends text file 522 to voice application 20 (along with user identifier 140) where it is handled by software application 160. Transmitting the user identifier is not strictly necessary, but a given application may require the user identifier in order to perform the service requested by the user. Also, transmitting the user identifier along with files 522 and 524 frees the speech service from having to keep track of which user is associated with which text file.

In step 640 application 160 uses text file 522 (representing the user's original voice command) to perform the function desired by the user to achieve a result. The resulting text is stored as text file 524. If desired, application 160 may immediately deliver text file 524 back to the user via any suitable technique such as by e-mail, by an SMS message, by sending to a particular URL, etc., whichever preference the user has set up previously or is the default. The text file is delivered directly back to the user by having the user set up an account with the application ahead of time, including information such as name, e-mail address, telephone number, web site, or other contact information. Or, the text file may be delivered to any other e-mail address provided by the user.

In step 644 the application delivers text file 524 back to the text-to-speech engine 50 along with user identifier 140 if necessary. In step 648 engine 50 converts text file 524 into speech file 526 using any of the techniques mentioned above. In step 656 the result speech file 526 is delivered to the user, preferably over the medium by which the user initiated the original voice command. For example, the speech service delivers speech file 526 to the user either by playing the speech file over the user's telephone, by delivering this speech file to the user's computer or by streaming the speech file to the user's computer. In an alternative embodiment, text-to-speech engine 50 may be present within voice application infrastructure 520 and the conversion of text file 524 into speech file 526 can occur within the infrastructure, thus saving time and effort. In this alternative embodiment, speech file 526 may be delivered from infrastructure 520 directly to the user using any of the methods described above.

Alternatively, there is no requirement that the resulting text file 524 be converted into an audio file. Text file 524 may be delivered as is directly to the user from the speech service, or, if the result desired by the user does not necessarily result in a textual output, there is no need for text file 124 to be produced as described in the examples given above.

Speech Controlled Devices

Figure 9:
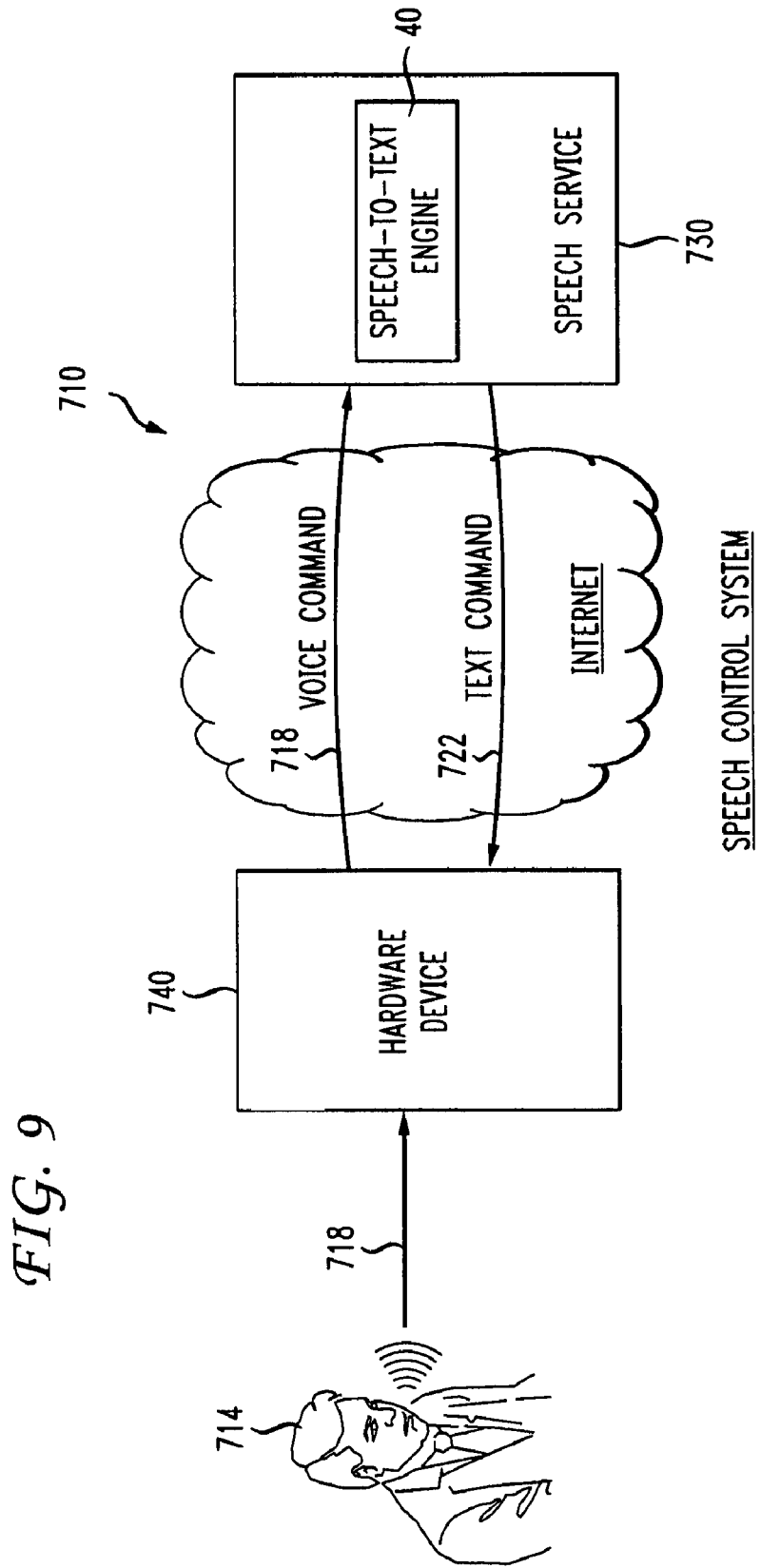
FIG. 9 is a block diagram of a speech control system according to a second embodiment of the invention by which a user controls a device using speech.

FIG. 9 is a block diagram of a speech control system 710 according to a second embodiment of the invention by which a user controls a device using speech. User 714 speaks an utterance, word, phrase or sentence to a hardware device 740. This voice command 718 is sent over the Internet to a speech service 730 that translates the voice command into a text command 722 using speech-to-text engine 40. The text command (or any alphanumeric command) is that acted upon by the hardware device as it understands this text command. Advantageously, a user may control any hardware device suitably enabled using only his or her voice. The remote speech service handles all speech-to-text conversion through the use of a central database of user and device profiles.

System 710 is a simple variation on this second embodiment in which the text command is sent back directly to the device and is readily understood by the device without further assistance. For example, a user speaks the word "ON" and this word is sent in text form to the device. Hardware and software in the device is then able to understand the meaning of this word and act upon it by turning the device on. The following figures present more complex variations and a detailed flow diagram. One of skill in the art upon reading this disclosure will be able to implement the invention of FIG. 9.

Figure 10A:
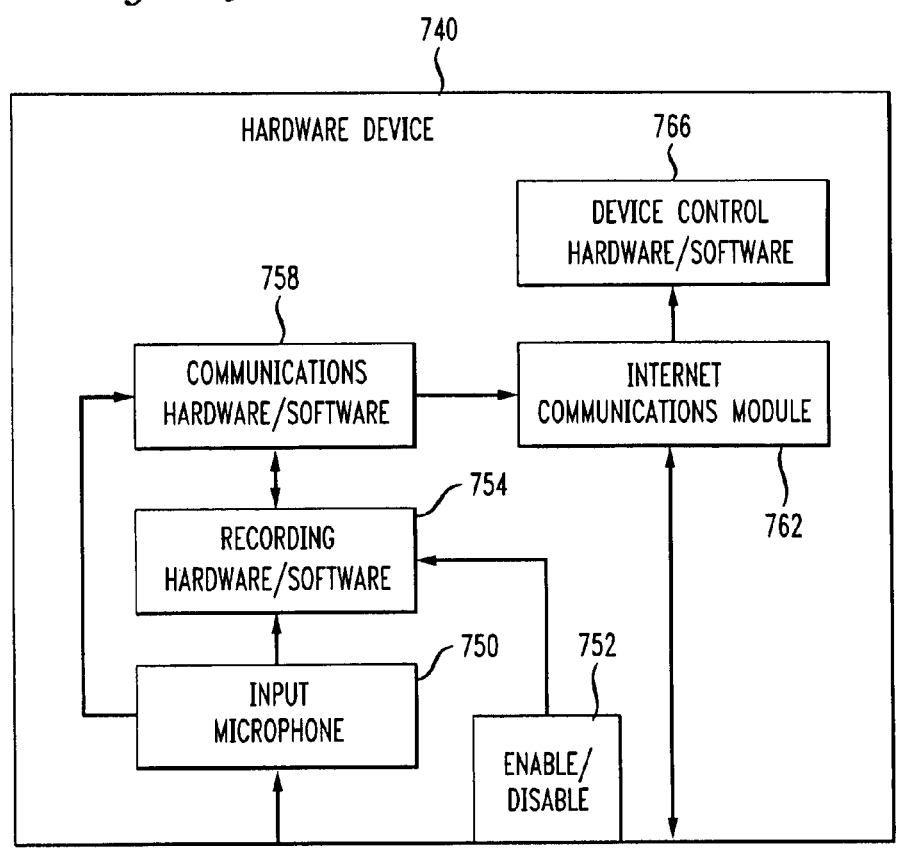
FIG. 10A is a block diagram of a generic hardware device showing only the hardware and software components of the device that enables the device to be controlled by speech.

FIG. 10A is a block diagram of a generic hardware device 740 showing only the hardware and software components of the device that enables the device to be controlled by speech. Other components that implement the actual functionality of the device (e.g., circuitry that enables a television remote control to control a television) are not shown. Device 740 may be any suitable hardware device having the capability to input user's speech, forward this speech on to a speech service over the Internet, receive a device command back over the Internet, and then act upon this device command. Preferably, device 740 includes some of the functionality shown in FIG. 10A that enables the device to perform these tasks. Of course, a device manufacturer may decide to implement this functionality in other manners. Device 740 may be a handheld device such as a mobile telephone, a remote control, a GPS, a PDA, a camera, a video camera, etc. The device may also be a larger piece of electronics such as a high fidelity system, a home appliance, a computer, office equipment, etc. The present invention is also suitable for much larger devices such as automobiles, heavy equipment, etc. [

Even mechanical devices that traditionally have no hardware or software components may be used with the present invention as long as the functionality described herein is built-in, added on or in some fashion incorporated into such a traditional mechanical device. For example, a lawn mower may be controlled by speech using the present invention as long as it has the described functionality built-in.

Device 740 includes an input microphone 750 that is suitable for capturing a user's voice and maybe any suitable microphone as is known in the art. Enable/disable button 752 is a button, toggle, touch sensitive pad or other similar mechanism that allows the user to enable or disable the recording and transmission of his or her voice command. For example, when disabled, the device will not respond to the user's spoken command. When actuated (by pressing or holding down, for example), though, the electronics are turned on and the device inputs, records and transmits the user's voice command as described below. For example, when the user needs to control a device, he or she simply holds down button 752 and speaks a command; when the command is done the user releases the button. In this way the user controls when the device responds to commands and prevents spurious reception of speech that is not a command. Button 752 may also turn the device on or off.

Recording hardware and software 754 is any suitable combination of hardware and software arranged to record the user's voice command. Hardware may be used exclusively, or a combination of hardware and software may be used. One of skill in the art is familiar with techniques for recording a person's voice. Communications hardware and software 758 is control logic that controls the recording, storage and communication of the user's voice command. This logic may be up implemented entirely in hardware, in firmware, or may be a software program executing on a microprocessor in conjunction with suitable memory. Internet communication module 762 is hardware and software that enables the device to connect to the Internet, to send the voice command, and to receive a device command over the Internet. This module is explained in greater detail below. Device control 766 is an application program in hardware or software designed by the vendor of the hardware device that controls the true functionality of the device using the normal input methods of the device. For example, control 766 responds to keypad entry, buttons, toggles, switches, a touch screen, a touchpad, a heat sensing input, or any input that the manufacturer has decided to use. In addition, control 766 receives a device command via module 762 and is able to understand that command and apply it to the device. It should be pointed out that implementation of these device components is entirely at the discretion of the device manufacturer. The manufacturer may choose to implement the received device command in any way that it chooses.

Internet communications module 762 communicates over the Internet using any of a variety of known Internet technologies, and may also use any technologies developed in the future. For example, if hardware device 740 is a wired device such as a computer, printer or other, module 762 uses a known network interface card, known IP protocols, and existing transmission media such as a cable Internet connection, a DSL Internet connection or a wireless Internet connection. In other situations where the hardware device is separate, module 762 may incorporate an 802.11 wireless interface for communicating with an Internet modem or a router located in a building. For example, any device located within the user's home or building, may connect wirelessly to the user's home computer system that includes a wireless modem or router having an available connection to the Internet.

In situations where the hardware device is a mobile telephone (or similar), the device may connect to the Internet using the WAP service or other similar technology that is already incorporated into the mobile telephone. Of course, one of skill in the art will be able to connect the hardware device to the Internet using other known Internet technologies. Module 762 allows the device to connect directly to the Internet where a known Internet connection is available, such as in a user's home. Outside of the home, where a known Internet connection is not necessarily available, the embodiment below may be used.

Figure 10B:
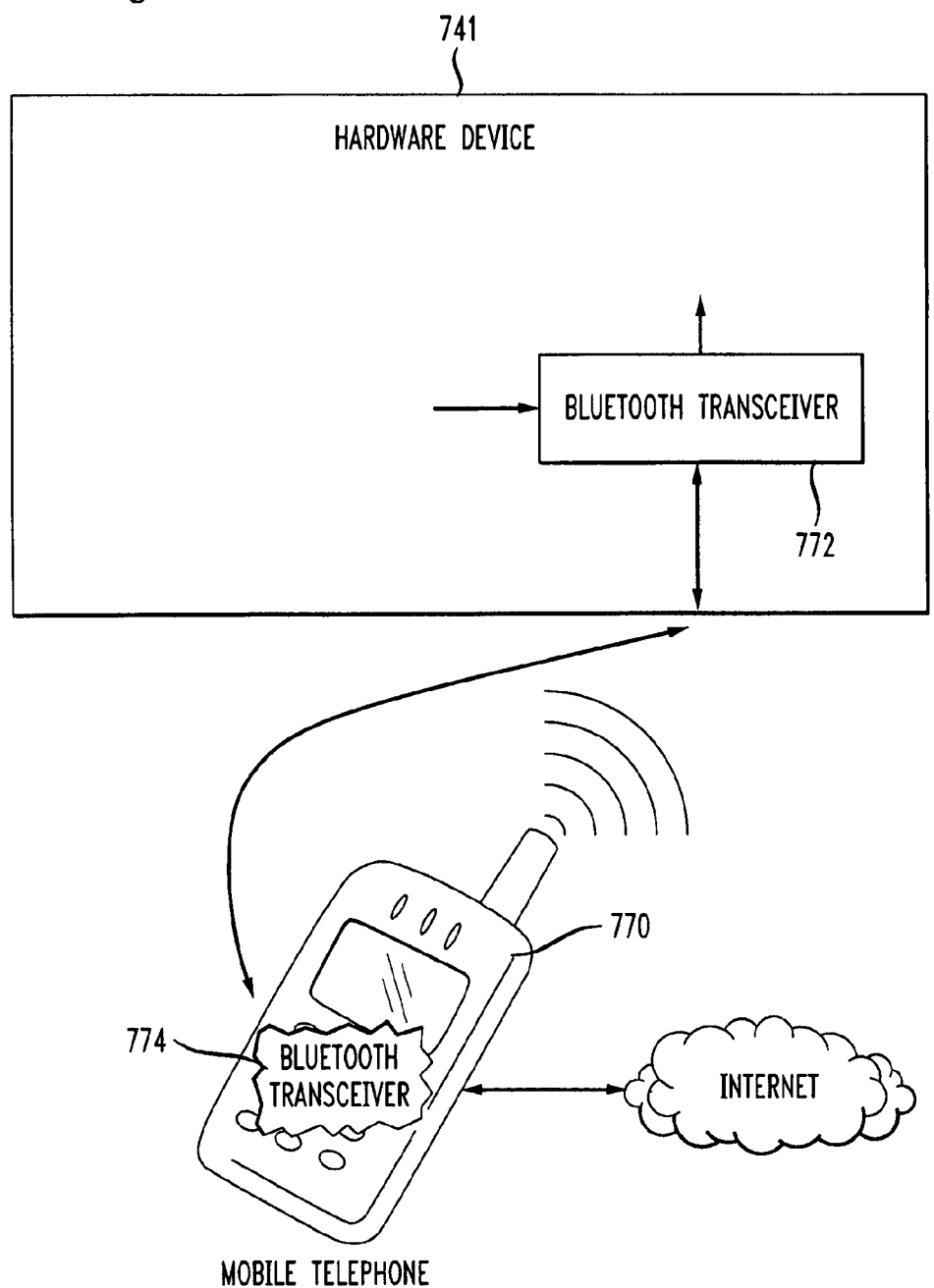
FIG. 10B is a block diagram of a generic hardware device showing Bluetooth transceiver that enables the device to be used outside the home (other modules as in device not shown).

FIG. 10B is a block diagram of a generic hardware device 741 showing Bluetooth transceiver 772 that enables the device to be used outside the home (other modules as in device 740 not shown). Transceiver 772 replaces module 762 in order to allow the hardware device to establish an Internet connection in most any environment where a known Internet connection may not be available. For example, any device 741 used outside the home may now establish an Internet connection using Bluetooth transceiver 772 that communicates with Bluetooth transceiver 774 inside any nearby mobile telephone 770 or similar portable device. In this fashion, most any hardware device 741 located within range of any Bluetooth-enabled mobile telephone 770 having an Internet connection may now be commanded by voice. As is known in the art, many mobile telephones or similar devices not only have Bluetooth capability but also have access to the Internet via WAP, GSM, GPRS or similar Internet service. Similarly, device 741 may communicate using the Bluetooth standard with a home computer having Internet capability.

It is anticipated that many mobile telephones will have both Internet connectivity and will use the Bluetooth standard. Thus, it will be possible to control most any device by voice that is in within range of such a mobile telephone. The mobile telephone may also include a router, switch or hub in order to enable the hardware device to connect to the Internet. Most mobile telephones connect the browser within the telephone to the Internet; addition of a hub, router or switch would allow that Internet connectivity to be shared with a nearby hardware device via Bluetooth.

As is known in the art, Bluetooth is a short-range radio technology designed to allow the exchange of voice and data between devices such as mobile telephones, personal computers and other hardware devices. Bluetooth-enabled devices can communicate with other similar devices as soon as they come within range of one another. The user does not need to press a button or give a command; an electronic conversation happens automatically. Once established, the Bluetooth devices create a piconet to connect the devices and stay in communication. In this fashion, as long as hardware device 741 is in the vicinity of a Bluetooth-enabled device such as mobile telephone 770 an Internet connection can be established and the device may be commanded as voice as described herein.

Figure 11:
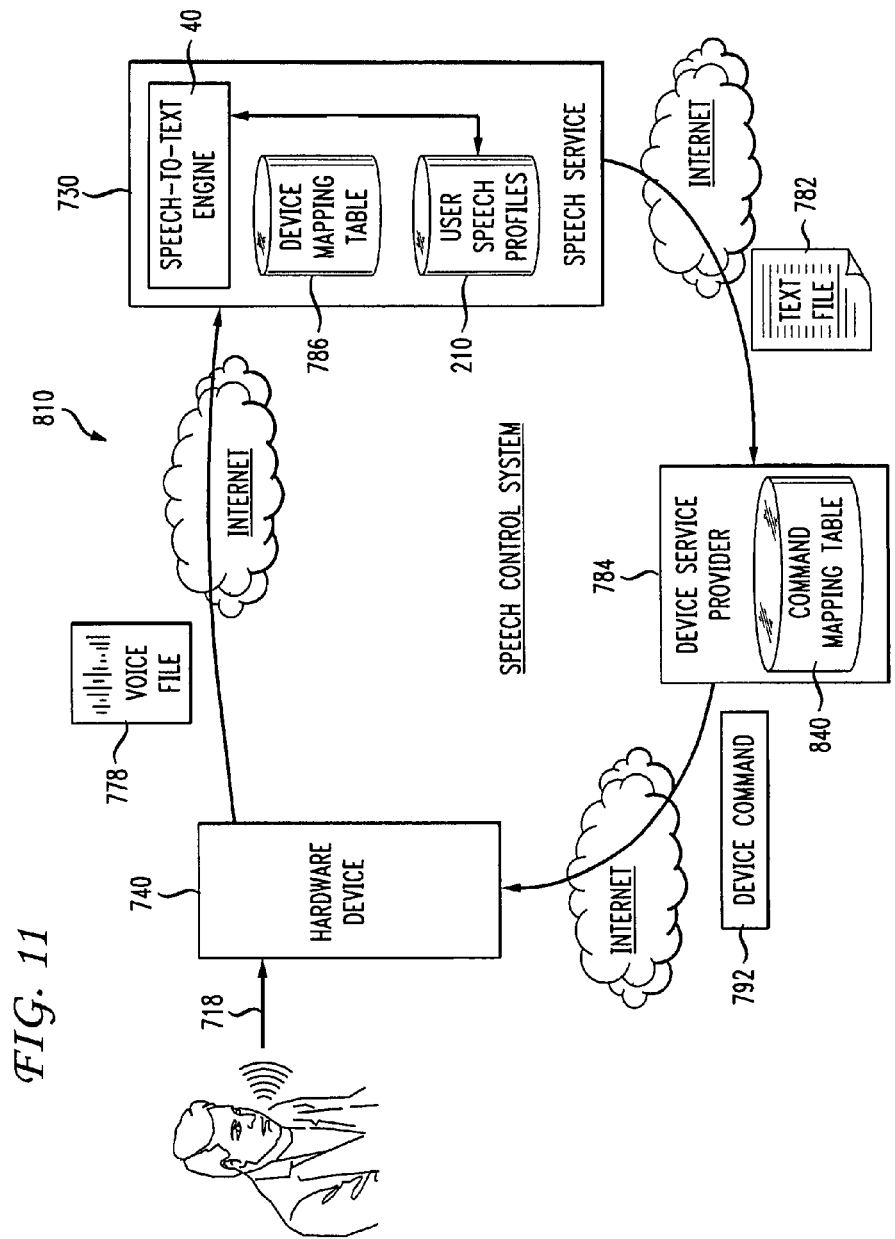
FIG. 11 is a block diagram of a generic hardware device showing Bluetooth transceiver that enables the device to be used outside the home (other modules as in device not shown).

FIG. 11 is a block diagram of speech control system 810 according to one variation of the second embodiment of the invention. System 810 illustrates that a user's voice command 718 is transmitted as a voice file 778 over the Internet to speech service 730 that converts the voice file into a text file 782. The text file is received by a device service provider 784 that produces a device command 792 for delivery back to the hardware device.

Figure 12:
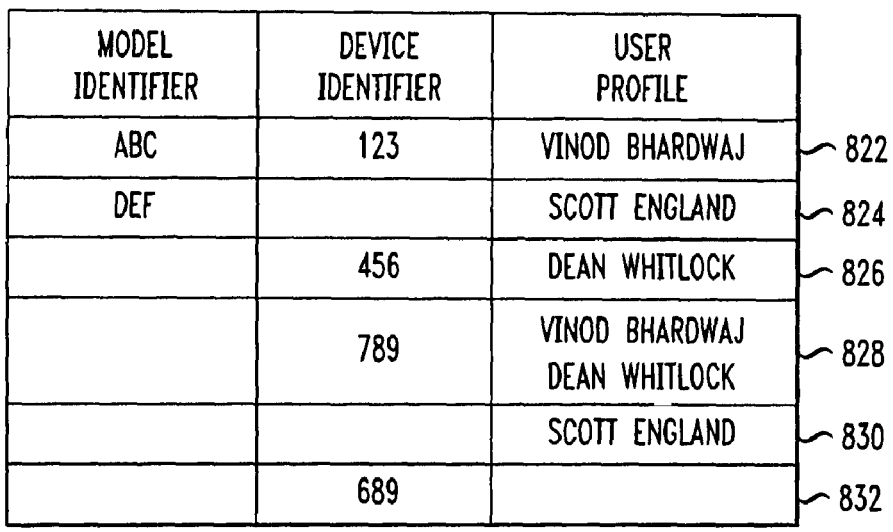
FIG. 12 illustrates a device mapping table showing how various identifiers for device are mapped into a particular user profile, if any.
Figure 13:
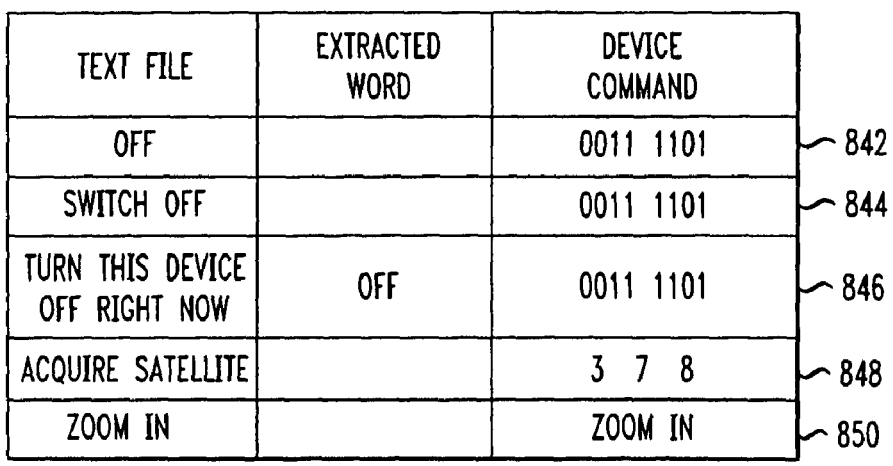
FIG. 13 illustrates a command mapping table showing how the user's spoken words are mapped into a particular device command.

FIG. 12 illustrates a device mapping table 820 showing how various identifiers for device 740 are mapped into a particular user profile, if any. FIG. 13 illustrates a command mapping table 840 showing how the user's spoken words are mapped into a particular device command.

Figure 14:
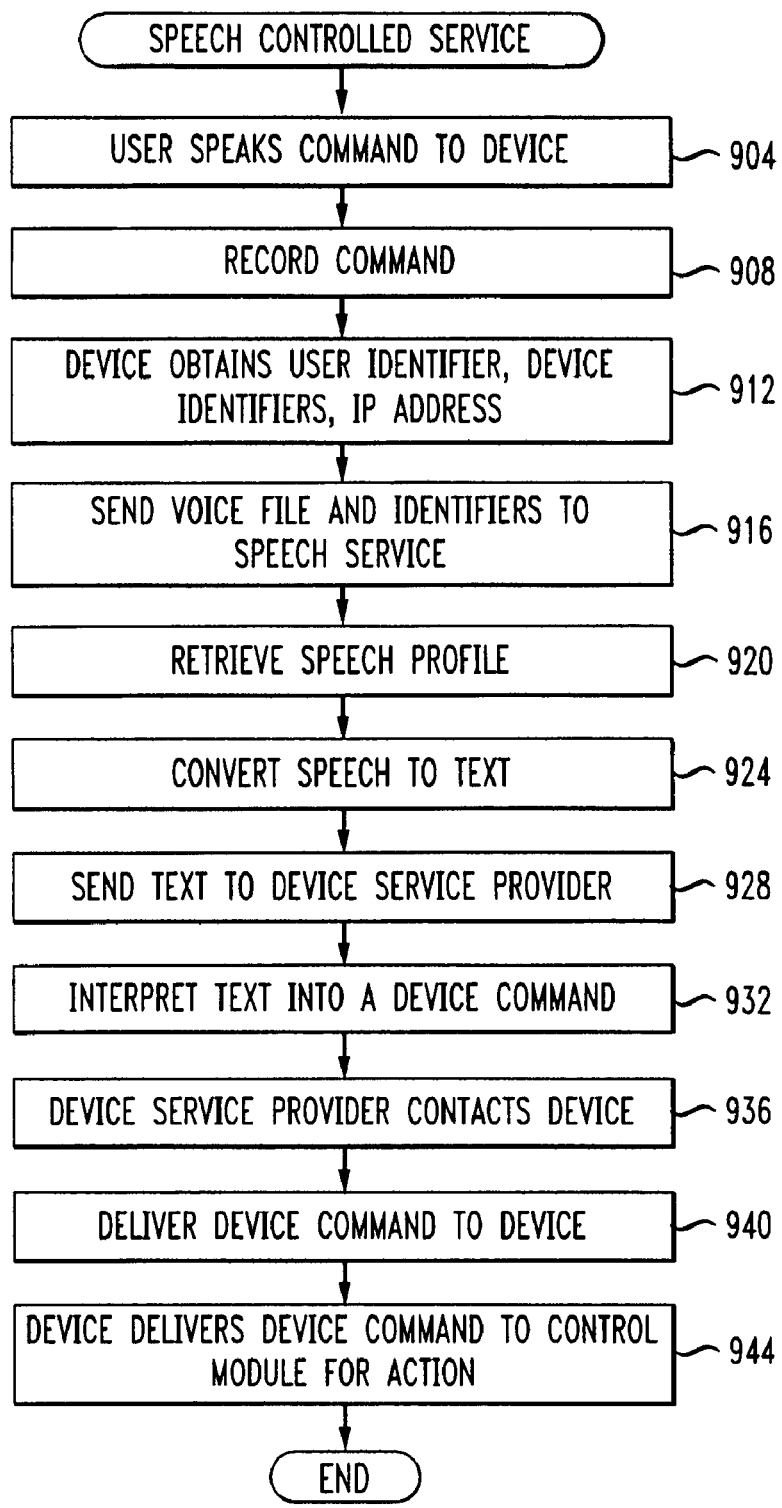
FIG. 14 is a flow diagram describing one embodiment for the implementation of speech control system.

FIG. 14 is a flow diagram describing one embodiment for the implementation of speech control system 810. In step 904 the user speaks a command to the device; the device is already on, or the user uses enable button 752 in order that the device receives the command.

In one embodiment, the device is always in record mode and spurious commands are avoided as the device and microphone are designed such that the user must speak directly to the microphone in close proximity.

In step 908 the device records the voice command input via microphone 750 through use of recording hardware and software 754 and creates a voice file 778. In a preferred embodiment, the voice command spoken by the user and input via microphone 750 is streamed directly over the Internet to speech service 730, for example. Streaming allows the voice command to be delivered to the speech service more quickly than if a voice file were recorded, and allows the device command 792 to be delivered back to the hardware device more quickly. In this preferred embodiment, voice input is delivered from microphone 750 directly to communications unit 758 and then via module 762 over the Internet.

In step 912 the device obtains identifying information such as a user identifier, device identifiers and an IP address of the device. A user identifier is useful for identifying a particular user profile (if needed) but is not strictly necessary. The device obtains the user identifier by accepting input from the user via a keypad or other means (either before or after the voice command) or by accessing a memory location in the device into which the user has previously stored his or her identifying information. Device identifiers include a serial number that uniquely identifies the particular device, a model number, or other similar identifiers. Although optional, these identifiers may be obtained by the device accessing a memory location in which these identifiers have previously been stored. The device may also be identified by its IP address if available. It should be pointed out that the need for storage and use of these identifiers is dependent upon the particular implementation chosen by the speech service and by the device service provider as described below. The device may have a static or dynamic IP address, or any suitable address that uniquely identifies the device on the Internet, such as a MAC address, device serial number, Bluetooth identifier, etc. The device service provider uses this address of the device on the network to know where to send the device commands.

In step 916 the device establishes an Internet connection with speech service 730 and sends voice file 778 and any obtained identifiers to the speech service. Internet communications module 762 establishes a connection with the computer server implementing speech service 730 using known Internet protocols. In one embodiment, the IP address of such a server is hardwired, programmed, or otherwise stored within device 740. Communications module 758 controls the storage and transmission of voice file 778 by transmitting the file once an Internet connection has been established. In one embodiment, once an Internet connection has been established, the connection is maintained so that the user may control the device until the user terminates the connection by pressing a button or performing a similar input.

Once the voice file and any identifiers needed for a particular implementation are received by the speech service, the speech service proceeds to convert the speech to text. In one embodiment, in step 920 a speech profile is retrieved from database 210 using device mapping table 786. For example, row 822 of table 820 illustrates how the model number and unique device identifier (such as a serial number) or uniquely identified with a particular individual who always commands the device using speech. This implementation is useful when the device is always used by a single person. Row 824 illustrates how the model number alone may be used to identify a single person and thus a particular speech profile; this implementation is useful if a unique device identifier is not available or not needed. Row 826 illustrates how a unique device identifier is associated with a single person and speech profile. Row 828 illustrates how a single device identifier is associated with two different people; this implementation is useful if more than one person commands the device by speech. The speech service may choose either profile with which to create text file 782 and may also use accuracy results from the speech-to-text conversion to choose the correct text file to send. A higher accuracy associated with a particular result indicates the correct speech profile. Row 830 illustrates how the speech service may default to a particular individual's profile on the basis of the IP address of the device when other identifiers are not available.

Row 832 illustrates that no particular speech profile may be chosen even in the presence of particular identifying information. This implementation is useful if it is desired not to use a particular individual's speech profile but instead rely upon the inherent accuracy of engine 40. In those situations where a device is being commanded using simple words or very short phrases, it is not strictly necessary to use an individual speech profile as engine 40 can accurately convert those commands to text.

In an alternative embodiment, the concept of a "common profile" or a "device profile" that is developed using a combination of various people's speech input may be used. In this embodiment the device itself is associated with a single user profile, regardless of how many people are actually speaking to the device. In other words, a common user profile is used to represent any number of users that speak to the device on a regular basis. This embodiment is most suitable for those situations where only a relatively small number of people speak to the device, and where these people share the same language. For example, a television remote control is likely only spoken to by a few number of people in a household and they would also use the same language. Using the techniques described herein and in the application entitled "Precision Speech-to-Text Conversion," commands spoken to the device are converted to text, and the device profile is updated and or corrected if necessary. In this fashion, the device profile builds up a vocabulary of words based on the input of a variety of people. For example, the device profile may include different entries for a single word depending upon how that word is spoken by different people. If four different people speak to the device and each has a different pronunciation for the word "on," the device profile will be modified to include four different entries for the spoken word "on" that each map to the same text word "on." In this fashion a single device profile may be used by device that is spoken to by different people and a different user profile for each person is not necessary.

In step 924 speech-to-text engine 40 converts the voice file into a text file 782 using any of the speech-to-text techniques mentioned above. A user speech profile is used or not as described above and depends upon a particular implementation.

In step 928 the speech service sends text file 782 over the Internet to device service provider 784. Also sent is any needed identifying information such as the IP address of the device and a user identifier. The user identifier may also uniquely identify a location of the device on the Internet. Device service provider 74 is preferably an Internet site operated by the device manufacturer or distributor that enables text file 782 to be translated into device command 792. In this fashion, a manufacturer or reseller of device 740 provides a separate service that enables the device to be controlled by speech. This implementation is useful if spoken commands are more lengthy or complicated and need to be mapped into a particular device command. Further, this enables device 740 to be designed with a minimal of hardware and software by placing the translation at site 784.

FIG. 13 illustrates a command mapping table 840 that shows one embodiment for translating the voice command of text file 782 into a specific device command 792. In step 932 the command in text file 782 is interpreted as being a specific device command. The device command column of table 840 contains particular device-specific commands that are understood by the control hardware and software 766 of the device. In other words, these device commands may be alphanumeric text strings, special characters, bytes of data, any sequence of binary digits, etc., that are used by control 766 to control the device. As such, a specific device command used is at the discretion of the device manufacturer.

Row 842 illustrates how a single word of a text file is mapped to a particular device command, in this example, a byte of data. Row 844 illustrates how a short phrase of the text file is also mapped to the same device command. In this implementation, the device service provider includes software that scans the text file for particular command words, such as the word "OFF." Row 846 illustrates how additional software of the provider is used to scan the phrase from the text file and to produce an extracted word that is likely a command word. These extracted words are then matched against entries in the extracted word column in order to map the word into a particular device command as shown. Row 848 illustrates how a particular phrase in the text file is mapped not to a single device command but to a series of commands, namely, the numerals 3 7 8. These commands are used where the particular voice command by the user necessitates that a series of functions be implemented on the device. For example, if the user were to operate the device by hand and wish to perform the function "acquire satellite," he might need to press three different buttons in succession. These three device commands "3 7 8" correspond to those three different buttons and enable the user to perform complex functions on the device by voice. Row 850 illustrates how a text command found in the text file may be used verbatim as a device command if control 766 is arranged to understand and act upon such a textual device command.

In step 936 the device service provider establishes an Internet connection to device 740 using the IP address of the device. In one embodiment, the provider uses a simple mapping table to map a user identifier to a particular IP address; this implementation is useful if a user signs up for such a service and is only controlling a single hardware device. Thus, knowledge of the user identifier identifies a unique hardware device. Or, if the user is controlling multiple devices, the user identifier in combination with identifying information from the device (such as a serial number) may also provide a unique IP address for the device. As mentioned earlier, any suitable unique identifying address for the device on the Internet may be used. In step 940 device command 792 is delivered to device 740 via Internet communications module 762. In step 944 module 762 delivers the device command to device control 766 in order that the command be acted upon as per the desire of the user.

Figure 15:
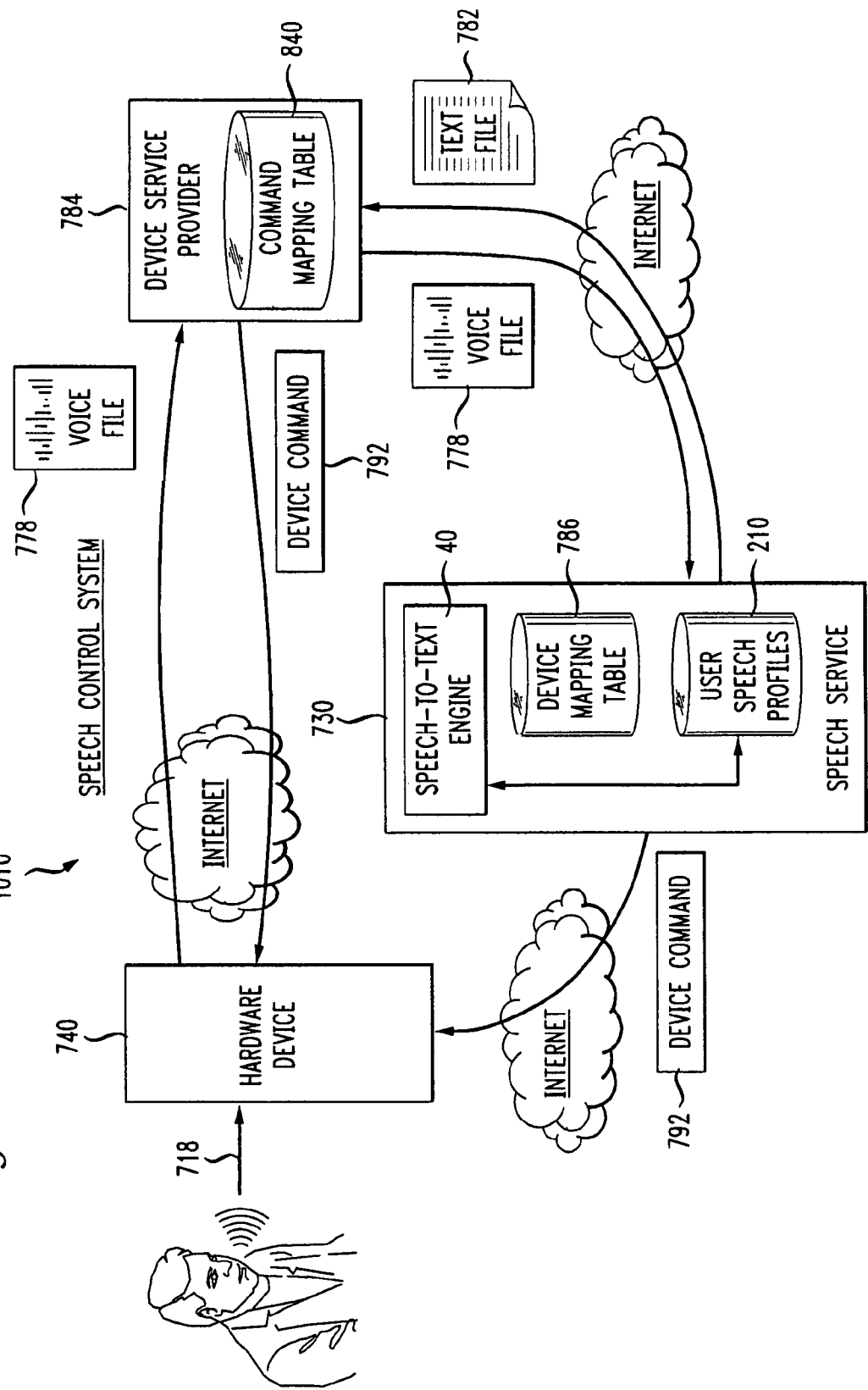
FIG. 15 is a block diagram of speech control system according to another variation of the second embodiment of the invention

FIG. 15 is a block diagram of speech control system 1010 according to another variation of the second embodiment of the invention. System 1010 illustrates that a user's voice command 718 to a hardware device 740 is transmitted as a voice file 778 over the Internet to device service provider 784 that that uses speech service 730 to produce a device command 792 for delivery back to the hardware device. The device command is delivered by the speech service or by the device service provider, depending upon the complexity of the command and the hardware device.

Figure 16:
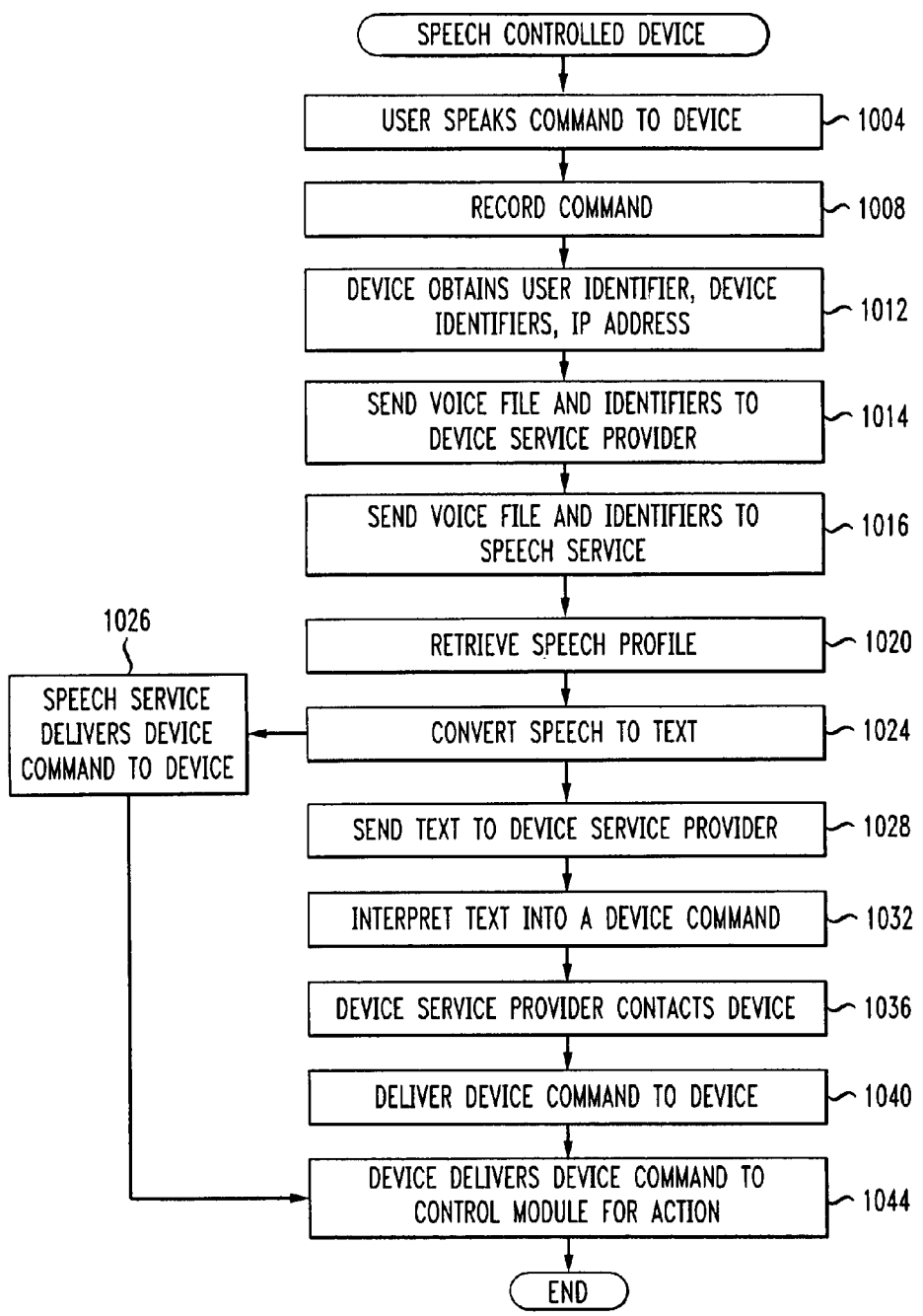
FIG. 16 is a flow diagram describing one embodiment for the implementation of speech control system.

FIG. 16 is a flow diagram describing one embodiment for the implementation of speech control system 1010. Further details concerning these steps are explained with respect to FIG. 14. In step 1004 the user speaks a command to the device; the device is already on, or the user uses enable button 752 in order that the device receives the command. In step 1008 the device records the voice command input via microphone 750 through use of recording hardware and software 754 and creates a voice file 778.

In step 1012 the device obtains identifying information such as a user identifier, device identifiers and an IP address of the device as described above in step 912. In step 1014 the device establishes an Internet connection with device service provider 784 and sends voice file 778 and any obtained identifiers to the service provider. In one embodiment, the IP address of the device service provider is hardwired, programmed, or otherwise stored within device 740. The device service provider may wish to insert itself between the device and the speech service in order to filter voice commands, monitor such commands, or otherwise control the process. In one embodiment, the provider simply forwards the information received.

In step 1016 the service provider sends voice file 778 and any obtained identifiers to the speech service 730. Once the voice file and any identifiers needed for a particular implementation are received by the speech service, the speech service proceeds to convert the speech to text. In one embodiment, in step 1020 a speech profile is retrieved from database 210 using device mapping table 786. In step 1024 speech-to-text engine 40 converts the voice file into a text file 782 using any of the speech-to-text techniques mentioned above. A user speech profile is used or not as described above and depends upon a particular implementation.

In one embodiment as described below in step 1026, the speech service delivers a device command directly to the device. In an alternative embodiment, in step 1028 the speech service sends text file 782 back over the Internet to device service provider 784. Also sent is any needed identifying information such as the IP address of the device and a user identifier. The user identifier may also uniquely identify a location of the device on the Internet.

In step 1032 the command in text file 782 is interpreted as being a specific device command as described above. In step 1036 the device service provider establishes an Internet connection to device 740 using the IP address of the device. In step 1040 device command 792 is delivered to device 740 via Internet communications module 762. In step 1044 module 762 delivers the device command to device control 766 in order that the command be acted upon as per the desire of the user.

In an alternative embodiment, the speech service delivers a device command directly to the hardware device without returning the text file to the device service provider. In this situation, voice file 778 is converted into text file 782 and the text within this file forms device command 792. This embodiment is useful where the device is fairly simplistic and commands are generally single words or short phrases and are limited in number. Further, the text itself must be understandable by the hardware device without further interpretation or mapping into another form. For example, row 815 provides an example where the device command is precisely the text file produced. Once the device command is identified, in step 1026 the device command is delivered to the hardware device using techniques described above, such as by using the IP address of the hardware device. In situations where the text file includes a complex phrase, or where the text needs to be mapped into a numeric value, routing the text file back to the service provider is preferable.

Speech Controlled Remote Devices

Figure 17:
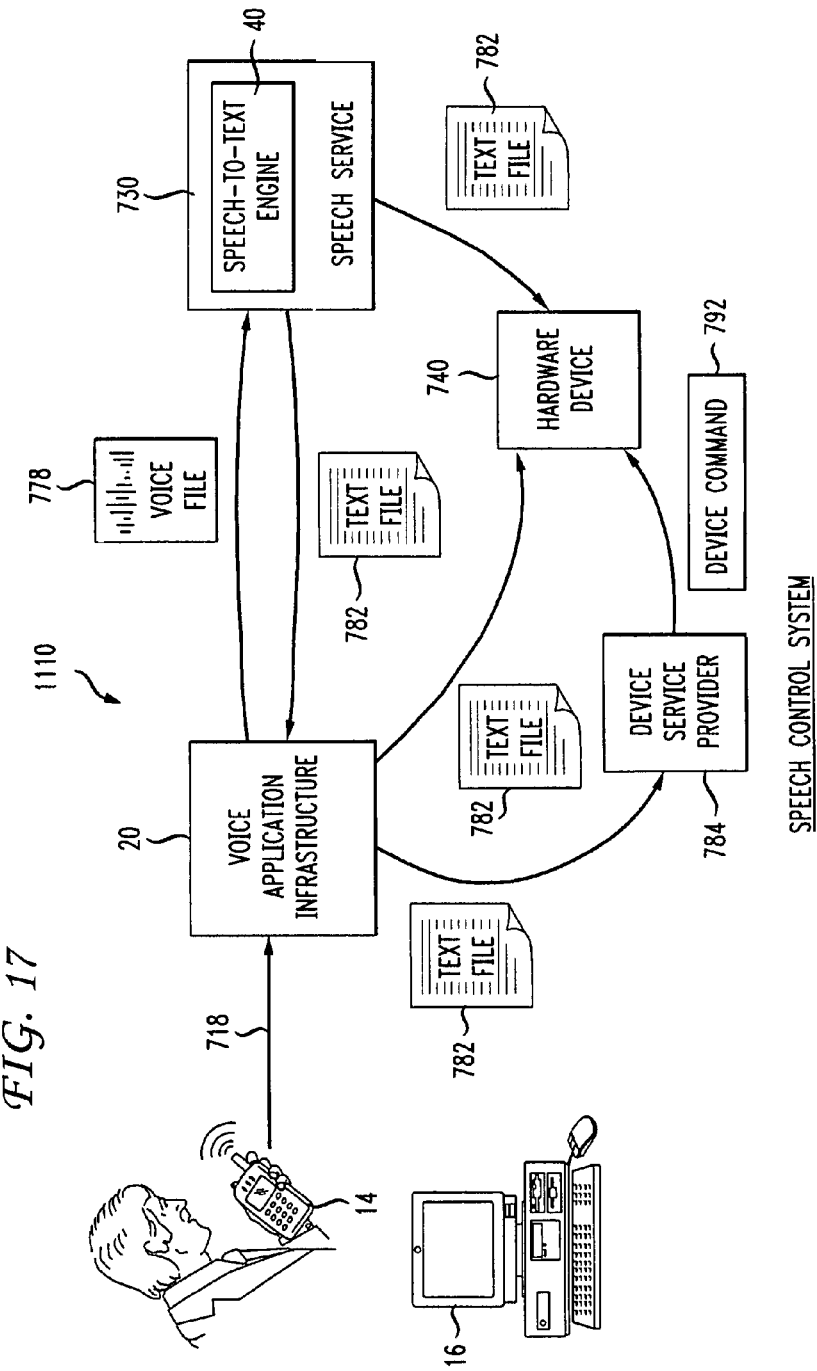
FIG. 17 is a block diagram of a variation of a third embodiment of the invention in which a remote hardware device is controlled using speech.

FIG. 17 is a block diagram of a variation of a third embodiment of the invention in which a remote hardware device is controlled using speech. In this variation, an implementation of speech control system 10 is combined with the techniques for speech control of devices above. One of skill in the art, upon a reading of the disclosure of FIGS. 1-5 and FIGS. 10-17 will be able to implement this embodiment.

Speech control system 1110 illustrates that a user inputs a voice command 718 over a telephone, computer or other suitable input device in order to control a remote hardware device 740. Communication between voice application 20, speech service 730, device service provider 784 and hardware device 740 occur over the Internet in one embodiment. The voice command is handled by voice application 20, for example, by an IVR system 120 in conjunction with a software application 160. Identifiers identifying the user, his or her IP address, the IP address of the speech service, the device service provider and the hardware device are obtained from the user, input by the user, derived from user characteristics (such as by caller identification), previously programmed into voice application 20, or are derived by the device service provider as explained above. For example, the IP address of speech service 730 is always known to voice application 20; the IP address of the device service provider is obtained using caller identification, and the location of hardware device 740 is obtained using a combination of user input and programmed IP addresses at the device service provider as explained above.

Once voice file 778 has been converted to text file 782 by engine 40, the speech service may deliver the text file as a device command directly to hardware device 740 in cases where it is known that the voice command will be short, simple and the text will be understood by the hardware device. The speech service obtains the IP address of the hardware device from software application 160 that uses a combination of caller identification and user input to derive the IP address. Alternatively, text file 782 is returned to the voice application that then delivers this text file directly to the hardware device itself using the IP address that the voice application has derived. Or, text file 782 is delivered to device service provider 784 that maps this text into a device command 792 using, for example, command mapping table 840 as described above. The IP address of the hardware device is passed to the device service provider by the voice application, or, the device service provider derives the IP address using a combination of caller identification and user input.

Figure 18:
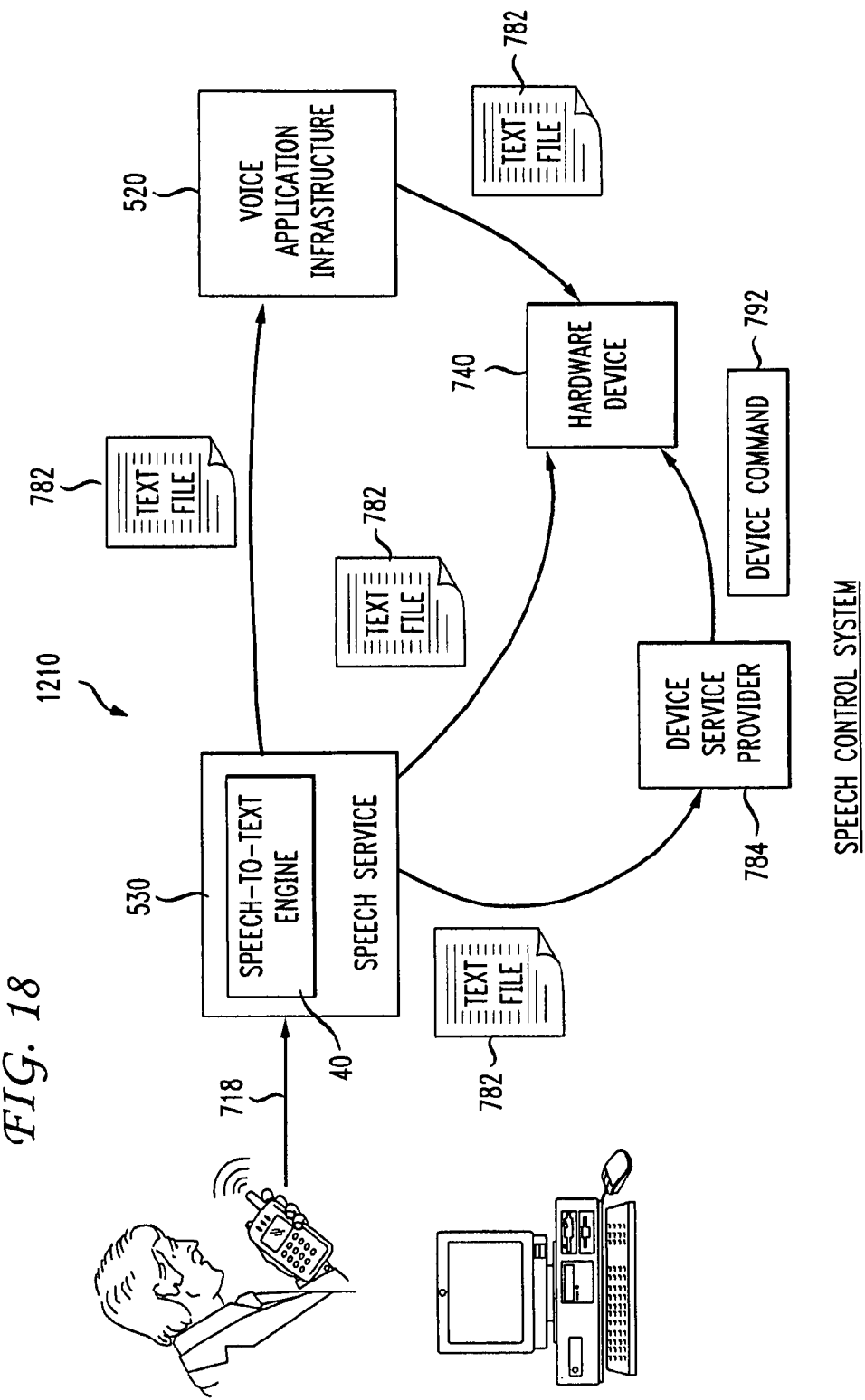
FIG. 18 is a block diagram of another variation of a third embodiment of the invention in which a remote hardware device is controlled using speech.

FIG. 18 is a block diagram of another variation of a third embodiment of the invention in which a remote hardware device is controlled using speech. In this variation, an implementation of speech control system 510 is combined with the techniques for speech control of devices above. One of skill in the art, upon a reading of the disclosure of FIGS. 6-9 and FIGS. 10-17 will be able to implement this embodiment.

Speech control system 1210 illustrates that a user inputs a voice command 718 over a telephone, computer or other suitable input device in order to control a remote hardware device 740. Communication between voice application 520, speech service 530, device service provider 784 and hardware device 740 occur over the Internet in one embodiment. The voice command is handled by speech service 530, for example, by an IVR system 540 in conjunction with a software application present within the speech service. Identifiers identifying the user, his or her IP address, the IP address of the device service provider, the voice application and the hardware device are obtained from the user, input by the user, derived from user characteristics (such as by caller identification), previously programmed into speech service 530, or are derived by the device service provider as explained above. For example, the IP address of voice application 520 is always known to speech service 530; the IP address of the device service provider is obtained using caller identification, and the location of hardware device 740 is obtained using a combination of user input and programmed IP addresses at the device service provider as explained above.

Once voice command 718 has been converted to text file 782 and delivered to the voice application, the voice application may deliver the text file as a device command directly to hardware device 740 in cases where it is known that the voice command will be short, simple and the text will be understood by the hardware device. The voice application obtains the IP address of the hardware device from the software application of the speech service that uses a combination of caller identification and user input to derive the IP address. Alternatively, text file 782 is delivered directly to the hardware device itself using the IP address that the speech service has derived. Or, text file 782 is delivered to device service provider 784 that maps this text into a device command 792 using, for example, command mapping table 840 as described above. The IP address of the hardware device is passed to the device service provider by the speech of service, or, the device service provider derives the IP address using a combination of caller identification and user input.

Speech Profiles and User Speech Input

The present invention also provides an advantage in recognizing unknown words or phrases. Because a human agent may be involved in the speech-to-text conversion, a user knows that any unknown word may simply be spelled in order to provide the accurate text. For example, if a user speaks the name "Vinod Bhardwaj" and understands that the speech engine may not understand that name initially, the user then immediately spells out that name letter by letter immediately after speaking the name. In other words, user would speak the following: "Vinod Bhardwaj V I N O D B H A R D W A J"—pronouncing each letter of the name after the name is spoken. The human agent hearing this speech would then be able to type in the name accurately and associate this spoken name with its text representation using a feature of the speech engine.

In an alternative embodiment, the user understands that the command "spell" (or any similar command) may be used before a string of letters in order to spell out a name. For example, in order to input the above named, a user would speak following: [pause] "spell V I N O D B H A R D W A J." This convention is understood by the agent as meaning that a word or phrase is to be spelled out; or, the speech engine automatically recognizes the spell command and interprets the succeeding letters as the spelling of a particular word or phrase. In this fashion, a user need only spell out an unknown word or phrase once and it is forever saved in his or her profile along with the matching text.

Any suitable method for obtaining a speech profile may be used. In one example, a speech transcription service uses speech service 30 to transcribe speech provided by users into text. This speech transcription service is available over the Internet or via any suitable telecommunications network such that a user may submit speech by telephone, computer, mobile device, etc. As users utilize this transcription service for their transcription needs, each user profile will become larger and more accurate. In this fashion, providing a transcription service (for free, for a nominal charge, or on a per word basis, for example) allows the system to develop user profiles that are stored centrally and that then be may be used in any of the embodiments described herein.

As is known, a user profile is simply a phonetic description of each word that a user speaks. Just as spelling describes a word alphabetically, a profile describes the same word phonetically as spoken by a certain user. For example, every time a user says a word, a phrase or a sentence, the service manually corrects the output of the speech engine and this output is fed back into to the speech engine in order to update the profile. Normally the speech engine includes the profile of a large group like Americans, British, Australians, southern Americans, etc., and the speech engine will try to find the word that fits with any of these profiles in order to obtain a certain level of confidence. In these examples the list of available words becomes extremely large. The best way to compare what is being spoken is to compare that spoken output with what a user himself speaks (i.e., a user profile), but that profile can only be obtained over time as a user speaks each word as a part of a sentence. But, it is also important for the speech engine to know that the word as transcribed by the service is correct before it is put in the profile. Thus, not only are the words that are corrected by the service added to the profile, but also the words that were correct to begin with are also put into the profile. Since the speech engine has no way of knowing if a word was exactly correct to begin with, these words are input back into the speech engine along with an indication that they were correct.

It is recognized that the phonetic profile for a certain word may be slightly different from the group profile that the speech engine provides. The idea of this aspect of the service is to store a list of words spoken by each person in his or her own user profile and use that profile to recognize speech rather than using the group profile. This user profile list will also be a lot smaller than the list of all the words spoken by all the users since each person has a limited vocabulary compared to the total vocabulary of the whole world. Thus, confusion will be much less since the speech engine only has to recognize the spoken word from a much smaller list of words in the user's profile.

Speech Delivery System

In a fourth embodiment, a speech delivery system allows a user to upload an audio file via his or her mobile telephone for transcription and delivery to a telephone, computer or similar device of a recipient. A recorded audio file has much cleaner voice data than a telephone connection and there is less chance that an audio file will be dropped during uploading. As most mobile telephones include a digital voice recorder, most anyone in possession of a mobile telephone (or similarly enabled computer) may record an audio file for later transcription and delivery simply by recording it and then sending the file to a speech delivery system. Such a technique avoids problems with the quality of live telephone connections and the problem of dropped connections.

Figure 19:
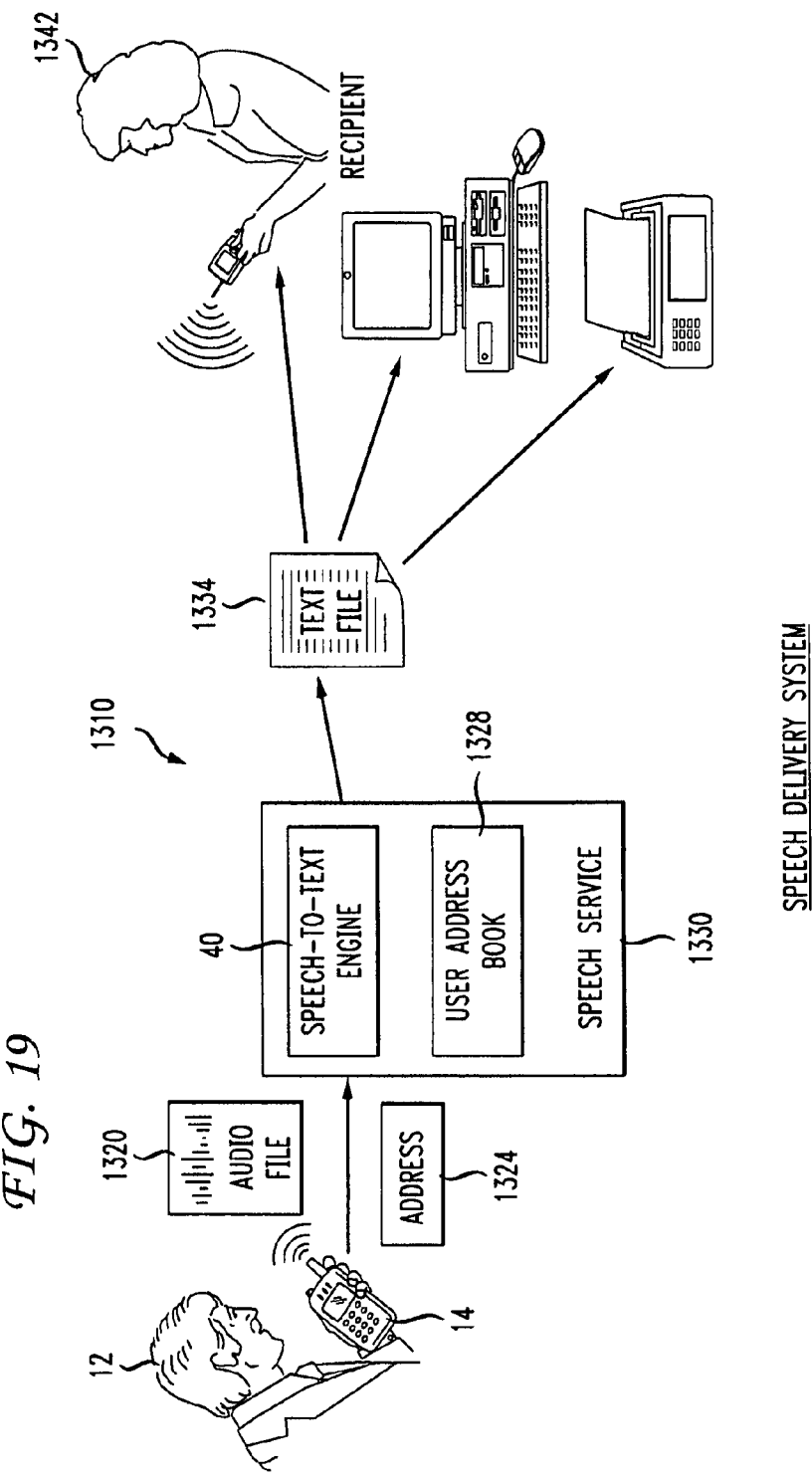
FIG. 19 illustrates a speech delivery system that allows audio data to be transcribed and delivered to a recipient.

FIG. 19 illustrates a speech delivery system 1310 that allows audio data to be transcribed and delivered to a recipient. System 1310 is a variation of system 510 shown in FIG. 5 and many of the features of system 510 are using system 1310. Included are a user 12 who communicates with speech service 1330 using mobile telephone 14, computer 16, or other similar device used to record speech and to transmit the resulting audio file. As is known in the art, the user uses his telephone to record an audio file 1320 including the user's speech. Once the audio file is saved on the device used by the user, the user then proceeds to select an address 1324 to which the audio file will be delivered. Preferably, address 1324 is an e-mail address that includes the domain of speech service 1330 as well as an indication of a recipient 1342 and a possible command to be used delivering text file 1334. The address may be selected by the user by choosing an item in an address book on the telephone, by typing in the address on a keypad, or by a combination of the above. Once the address is selected, the user sends audio file 1320 to speech service 1330 using address 1324.

Speech service 1330 includes speech-to-text engine 40 and a user address book 1328. The user address book is optional and may be input by the user at a previous time using a web site of the speech service during a registration process or any time thereafter. Receipt of the audio file at the particular address is handled, for example, by computer 550 that includes e-mail server software. Any of the techniques described with respect to FIGS. 6 and 7 may be used to identify a user identifier 140. For example, the source e-mail address or other identifier associated with device 14 may be used to determine the unique user identifier. Once the audio file is transcribed by engine 40 (using the techniques described herein or in the application entitled "Precision Speech-to-Text Engine" referenced above), the resultant text file 1334 is delivered to recipient 1342 at a mobile telephone, computer, PDA, BLACKBERRY-type e-mail device, facsimile machine or other similar device using the addressing techniques that will now be described.

Figure 20:
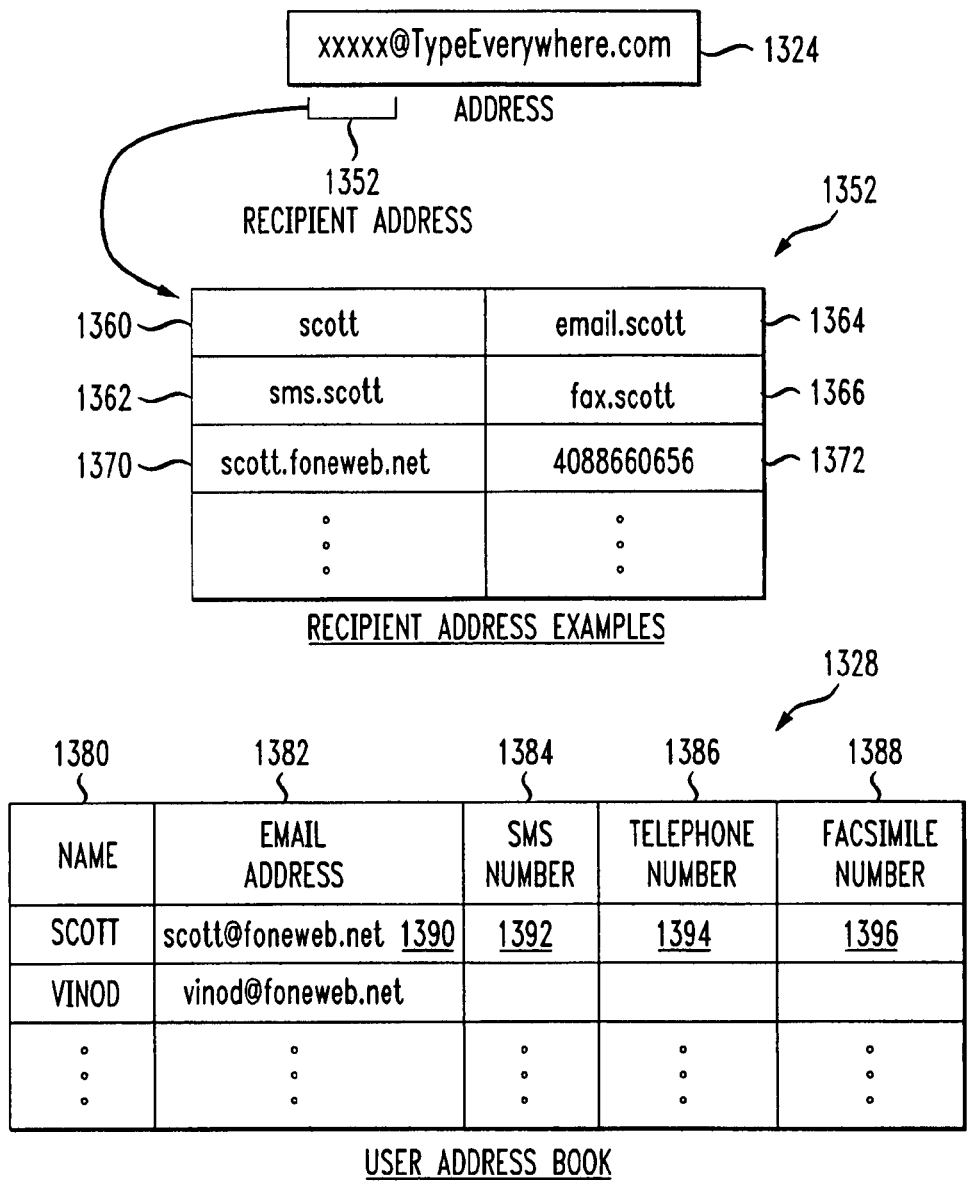
FIG. 20 illustrates an address in template form, recipient address examples, and an example user address book.

FIG. 20 illustrates an address 1324 in template form, recipient address examples 1352, and an example user address book 1328. Address 1324 includes a domain portion, in one particular embodiment, the domain being "TypeEverywhere.com." A recipient address 1352 is represented in the address 1324 as the field "XXXXX;" the filed "XXXXX" is replaced by one of the examples shown in table 1352. The recipient address is an indicator added by user 12 to indicate to whom text file 1334 should be sent and to which particular device it should be sent. In one embodiment, a user address book 1328 is used to match up a recipient address 1352 with an exact destination. For example, field 1380 includes any suitable name, nick name or other identifier for a recipient. Field 1382 includes the exact e-mail address of each recipient, and fields 1384-1388 includes the exact telephone numbers and other numbers to which the text file may be sent. Recipient address "Scott" 1360 indicates that the default address for recipient "Scott" should be used, for example the e-mail address. In a variation, no default is used and the recipient address "e-mail.Scott" 1364 indicates that field 1382 for that particular recipient should be used. Recipient address "SMS.Scott" 1362 indicates that the SMS number 1392 should be used for recipient "Scott." Recipient address "fax.Scott" 1366 indicates that facsimile number 1396 should be used for recipient "Scott."

In an alternative embodiment, user address book 1328 is not needed and the exact e-mail address or telephone number to which the text file should be delivered is included in the recipient address. For example, recipient address 1370 indicates that the e-mail address for delivery is "Scott.foneweb.net." Speech service 1330 replaces the first period with the "@" symbol to obtain the correct e-mail address: Scott@foneweb.net. Each user understands that to use this alternative embodiment, the "@" should be replaced by any agreed upon character so as to not interfere with the "@" in address 1324. The speech service then simply replaces the agreed upon character with the "@" in order to obtain the correct e-mail address for the recipient. Or, the recipient address is simply the recipient's telephone number 1372 that indicates a mobile telephone or facsimile machine to which a text message or document may be delivered. The speech service understands that the recipient address field will be implemented according to one of these embodiments and takes appropriate steps to deliver the resulting text file 1334 to the appropriate device of the recipient 1342.

In this alternative embodiment is not necessary for a user to sign up or register with the speech service ahead of time. Any user can send a text file to any recipient simply by recording a message on their mobile telephone and then sending the audio file as an attachment to the domain of the speech service, where the recipient address field 1352 is replaced by one of the examples shown in table 1352. A user may even send an e-mail message to oneself using this technique and the resultant e-mail message may then be edited, forwarded, saved, etc.

In addition, the field 1352 may be used to perform functions other than indicating a recipient address. For example, field 1352 may include a word, letter or symbol indicating a command to be performed on the audio file or text file, such as: perform a spelling check, store the text file, send the text file to multiple destinations, send at a particular time, mark as urgent, use a particular user profile for converting the speech to text, use a particular IP address, use the text file as a search term at a destination web site, etc.

Mobile and Wireless Communications

The present disclosure has described using the Bluetooth standard to communicate over the Internet and using WAP for a mobile telephone to connect to the Internet. Nevertheless, the embodiments of the present invention may use any of a variety of known and future-developed technologies to communicate between devices and over the Internet. For example, a hardware device may communicate with a mobile telephone (or similar device) having Internet connectivity using the Bluetooth standard, IrDA (infra-red), Ultra-Wideband (UWB), RFID, ZigBee (IEEE 802.15.4), NFCIP-1, WPAN, HiperLAN, or other wireless protocols that allow hardware devices to communicate. Similarly, a mobile telephone may connect to the Internet using 2G technologies such as WAP, GPRS, EDGE, etc., or may use any of the variety of 3G technologies becoming available. Further, a computer or other wireless device may connect directly to the Internet using 802.11 standards as described above, using the 802.16 WiMax standard, 802.20, Ultra-Wideband (UWB), or other.

Applications of Speech Controlled Services

In one application, the speech service allows any web site to be searchable by spoken user input. A user contacts a web site (or corresponding software application) by mobile telephone as described above and speaks any chosen search term. The spoken search term is converted to text by the speech service and returned to the web site or software application. The web site then uses the search term to perform a search or lookup on the chosen web site and returns the corresponding content to the speech service. The speech service then converts that content to speech, and returns it to the web site which in turn plays back that speech to the user over his or her mobile telephone as the result.

For example, the user speaks any of the phrases "address," "driving directions," "stock price," "founders," "San Francisco weather," etc., and he or she receives as result spoken information over the mobile telephone providing the answers corresponding to these voice commands. Creating the software application to input such a text phrase and output the corresponding answer is the responsibility of the web site owner. Implementing such a software application may be performed in many different ways. In a simple example, the web site owner creates a database having a list of frequently searched for phrases and corresponding content, e.g., the phrase "address" is matched with the resulting content "123 Elm St." in the database. Any number of phrases and their corresponding content may be stored in a database in association with a particular web site and thus provide any caller with answers to questions they have concerning the web site.

In another implementation, the web site provides a built-in search tool that a user may normally access via the Internet (such as a GOOGLE search window) in order to perform a keyword search on the web site. In this implementation the text phrase provided by the speech service to the web site is fed directly into that search tool (via a programming interface). The search tool then performs its normal search of a web site (just as if a user had entered text on a computer over the Internet) and returns the resulting content. A software application may modify or shorten the content so that it is short enough for suitable delivery back to the user. This resulting content is then converted into speech by the speech service, returned to the web site and then played back for the user on his or her mobile telephone.

In another implementation, a web site might not have a custom database and might not have a built-in search tool. In this implementation the text phrase provided by the speech service to the web site is used to perform a keyword search of the entire web site (or web page) using a suitable software application. The content that is found is then shortened if necessary by the software application, returned to the speech service for conversion into speech, and then played back for the user.

In yet another implementation, a web site keeps track of text phrases provided to it for which it is not able to generate a suitable result. Periodically, these text phrases are reviewed in order to update the custom database of search terms, tweak the search tool, or modify the software application used for searching.

The advantage of this first application is that a search may be performed of the entire, normal web site of the company, rather than forcing a user to interact with a streamlined version of a web site such as is normally provided to a user on his or her mobile telephone using the wireless application protocol (WAP). Content provided on a mobile telephone using WAP is an abbreviated version of the actual web site and may not allow user to perform a meaningful search because much of the content is missing.

In a second application the speech service allows a user to interact with a remote software application or with a web site as questions and answers are passed back and forth. A user contacts a web site (or corresponding software application) by mobile telephone as described above and speaks any chosen command. The spoken command is converted to text by the speech service and returned to the web site or software application. The software application determines that further information is needed from the user and returns a question in the form of text to the speech service. The speech service converts the question to speech, returns the speech to the web site, and the web site then plays back that speech to the user over his or her mobile telephone. In response to that question the user then speaks a second command that is processed as above and results in the text of that second command being input to the software application. The software application sends back another query as above or takes action depending upon the context of the commands.

For example, a user speaking the command "pizza" to a pizza company on his or her mobile telephone would receive back the spoken question "which size?" The user then speaks "large," hears the spoken question "which kind?" and responds with "vegetarian." At this point the user hears the result "ready in 10 minutes" and the software application at the pizza company takes appropriate action to see that the order is processed.

In another example of this second application a user interacts with a software application on an airline computer in order to determine if an arriving flight is on time. The user is prompted by the software application (via the speech service) by speech on his or her mobile telephone to speak information such as "airline," "city," "flight number," etc. The user speaks this information that is relayed to the software application as text (via the speech service) in order that the user may receive the correct flight information spoken to him on his mobile telephone.

In yet another example of this second application the user interacts with a software search tool on a web site in order to refine the search. Using the speech-to-text conversion and text-to-speech conversion of the speech service, a user speaks into his mobile telephone in order to perform a search on a web site. The user speaks "address," the search tool responds with "specify a city for company branch" as speech on the telephone, and the user speaks "San Francisco." The search tool then provides text of that company's San Francisco address that is converted to speech and played back for the user on his mobile telephone. Of course, iterations of this interaction may occur depending upon the complexity of the search.

Applications of Speech Controlled Devices

In one application, the speech service allows a software program on a computer to be controlled by a user's voice. Commands or phrases spoken by the user are received by a microphone connected to the computer and forwarded over an Internet connection to the speech service where the speech is converted into text. In one implementation the text is returned directly from the speech service over the Internet to the computer to be used immediately by the software program. For example, the command "new window" spoken by the user is returned as the text "new window" and this text command is input to the software program and acted upon.

In another implementation the converted text is forwarded from the speech service to a software service provider web site that translates the text into commands, characters, etc. that are understood by the software program. For example, the text "new window" is translated into the command "control-N" which can be directly understood by a software program. In this fashion the software service provider web site translates user-spoken commands into corresponding commands understandable by a software program. In yet another implementation this intermediate translation service is implemented by a software program on the user's computer. For example, the text "new window" is returned directly from the speech service to the user's computer, but is then translated into the command "control-N" by an intermediate software program on the user's computer before being input to the intended software program.

In this application each software program able to be controlled by a user's voice may have a relatively small vocabulary of commands that it is expecting (for example, 200 commands). In one variation, using the techniques of application Ser. No. 11/368,840 a human agent may be used to translate ambiguous commands ("make bigger") into program specific commands ("zoom in"). In this variation the human agent is supplied with the vocabulary of commands applicable to a given software program and uses his or her intelligence to translate the user's spoken commands into one of the accepted commands. Using options available in the speech engine, the agent permits the voice command "make bigger" to be associated with the text "zoom in." Thereafter, the user may use the phrase "make bigger" and have it be directly converted to the text "zoom in" without human intervention. Each speech engine typically has an option whereby a particular spoken phrase may be associated with text that is entirely different.

An agent may also be provided with a drop-down menu to facilitate choosing an accepted command in light of the user's voice command. Alternatively, the user is provided with feedback indicating a range of accepted commands and the user is allowed to choose the appropriate command. In this fashion, frequently used commands by the user that are not exact matches with the vocabulary of commands acceptable to the software program can be matched to the acceptable commands.

Computer System Embodiment

Figure 21A:
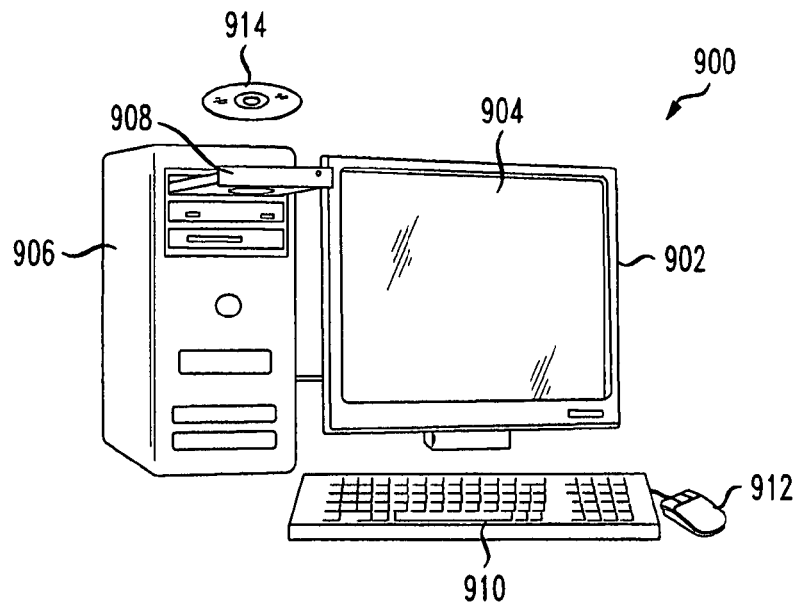
FIGS. 21A and 21B illustrate a computer system suitable for implementing embodiments of the present invention.
Figure 21B:
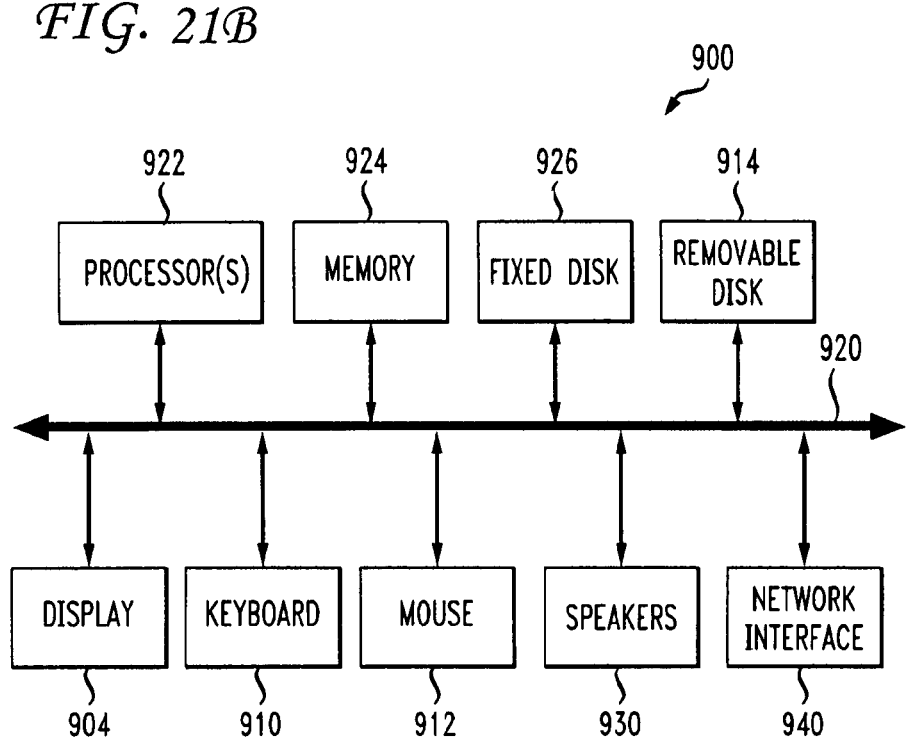

FIGS. 21A and 21B illustrate a computer system 900 suitable for implementing embodiments of the present invention. FIG. 21A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 21B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of controlling a hardware device comprising:
   receiving a voice command and a device identifier over a network from a remote hardware device, said voice command originating with a user, wherein said voice command requests a function be performed by said hardware device that is desired by said user, and wherein said device identifier identifies said hardware device;

identifying a user speech profile using said device identifier, wherein said user speech profile is a device profile that represents a plurality of users that speak to said remote hardware device, the vocabulary of said device profile being built up using the speech input of said plurality of users;

retrieving said identified user speech profile from a central database;

converting said voice command to a corresponding text command using a speech-to-text engine and said user speech profile;

delivering said text command to a device service provider;

mapping said text command into a corresponding device command by said device service provider, said device command being executable by said hardware device; and delivering said device command over said network to said remote hardware device in order that said hardware device perform said function requested by said user.

2. A method as recited in claim 1 further comprising:
applying said device command to said hardware device and achieving said function to be performed desired by said user.

3. A method as recited in claim 1 wherein said text command and said corresponding device command both request said function be performed by said hardware device.

4. A method as recited in claim 1 further comprising:
receiving said voice command and said device identifier over said network via a mobile telephone in communication with said hardware device, said mobile telephone being separate from said hardware device; and
delivering said device command to said remote hardware device via said mobile telephone.

5. A method as recited in claim 4 wherein said hardware device and said mobile telephone communicate with each other using a short-range radio technology.

6. A method as recited in claim 1 wherein said device command is a device-specific command understood by control hardware and software of said remote hardware device.

7. A method as recited in claim 1 wherein said device command is different from said text command.

8. A method as recited in claim 1 wherein said device command a binary value.

9. A method as recited in claim 1 wherein said device command is allowed to be the same as said text command and is allowed to be different from said text command.

10. A method as recited in claim 1 wherein a different user speech profile for each of said plurality of users is not necessary for said controlling of said hardware device.

11. A method of controlling a hardware device comprising:
receiving a voice command and a device identifier over a network from a device service provider, said voice command originating with a user and said device identifier originating with an identifying a hardware device, wherein said voice command requests a function be performed by said hardware device that is desired by said user;

identifying a user speech profile using said device identifier, wherein said user speech profile is a device profile that represents a plurality of users that speak to said remote hardware device, the vocabulary of said device profile being built up using the speech input of said plurality of users;

retrieving said identified user speech profile from a central database;

converting said voice command to a corresponding text command using a speech-to-text engine and said user speech profile;

delivering said text command to said device service provider;

mapping said text command into a corresponding device command by said device service provider, said device command being executable by said hardware device; and delivering said device command over said network to said remote hardware device in order that said hardware device perform said function requested by said user.

12. A method as recited in claim 11 further comprising:
applying said device command to said hardware device and achieving said function to be performed desired by said user.

13. A method as recited in claim 11 wherein said text command and said corresponding device command both request said function be performed by said hardware device.

14. A method as recited in claim 11 further comprising:
receiving said voice command and said device identifier at said device service provider via a mobile telephone in communication with said hardware device, said mobile telephone being separate from said hardware device; and
delivering said device command to said remote hardware device via said mobile telephone.

15. A method as recited in claim 14 wherein said hardware device and said mobile telephone communicate with each other using a short-range radio technology.

16. A method as recited in claim 11 wherein said device command is a device-specific command understood by control hardware and software of said remote hardware device.

17. A method as recited in claim 11 wherein said device command is different from said text command.

18. A method as recited in claim 11 wherein said device command a binary value.

19. A method as recited in claim 11 wherein said device command is allowed to be the same as said text command and is allowed to be different from said text command.

20. A method as recited in claim 11 wherein a different user speech profile for each of said plurality of users is not necessary for said controlling of said hardware device.

* * * * *